US005719780A

United States Patent [19]

Holmes et al.

[11] Patent Number: 5,719,780

[45] Date of Patent: Feb. 17, 1998

[54] MEDICATION TIMING DEVICE

[75] Inventors: Gordon W. Holmes, Mississauga, Canada; Orville D. Moe, Camarillo, Calif.

[73] Assignee: Medi Innovations Inc., Mississauga, Canada

[21] Appl. No.: 591,635

[22] PCT Filed: Aug. 17, 1994

[86] PCT No.: PCT/CA94/00445

§ 371 Date: May 6, 1996

§ 102(e) Date: May 6, 1996

[87] PCT Pub. No.: WO95/05143

PCT Pub. Date: Feb. 23, 1995

[30] Foreign Application Priority Data

Aug. 17, 1993 [GB] United Kingdom .................. 9317125

[51] Int. Cl.[6] .............................. G06F 17/00; G06G 7/48

[52] U.S. Cl. ................ 364/479.01; 364/188; 364/479.02

[58] Field of Search .................................... 364/188, 479, 364/479.01, 479.02; 368/243, 244, 223

[56] References Cited

U.S. PATENT DOCUMENTS

| | | | |
|---|---|---|---|
| 3,911,856 | 10/1975 | Ewing | 116/121 |
| 4,034,757 | 7/1977 | Glover | 128/260 |
| 4,038,937 | 8/1977 | Möe | 116/121 |
| 4,158,411 | 6/1979 | Hall et al. | 206/531 |
| 4,223,801 | 9/1980 | Carlson | 221/3 |
| 4,258,354 | 3/1981 | Carmon et al. | 340/309.4 |
| 4,275,384 | 6/1981 | Hicks et al. | 340/309 |
| 4,295,567 | 10/1981 | Knudsen | 260/534 |
| 4,361,408 | 11/1982 | Wirtschafter | 368/10 |
| 4,389,963 | 6/1983 | Pearson | 116/308 |
| 4,413,885 | 11/1983 | Hareng et al. | 350/342 |
| 4,419,016 | 12/1983 | Zoltan | 368/10 |
| 4,473,884 | 9/1984 | Behl | 364/479 |
| 4,553,670 | 11/1985 | Collens | 206/534 |
| 4,897,883 | 1/1990 | Harrington | 455/603 |
| 4,926,572 | 5/1990 | Holmes | 40/448 |
| 5,157,640 | 10/1992 | Backner | 368/10 |
| 5,200,891 | 4/1993 | Kehr et al. | 364/479.01 |

*Primary Examiner*—Reba I. Elmore
*Assistant Examiner*—McDieunel Marc
*Attorney, Agent, or Firm*—Sim & McBurney

[57] ABSTRACT

A medication regime control device employs a plurality of liquid crystal displays controlled by a preprogrammed electronic circuit to display to a patient the number of doses of selected identified medications to be consumed at the time of display and any special instructions with respect thereto. The device acts as a watch and personal identifier between displays of the need to take medication.

33 Claims, 17 Drawing Sheets

Time & Date Mode -
Plus Patient's Initials

Medication Mode -
Tells When, What, & How Many Of Each...!

Food Reminder Mode -
Take With FOOD

No Dairy Mode -
NO DAIRY Products

Do Not Take Mode -
Example: OMIT A

Unusual Mode -
√ LABEL on Prescription Vial

Time For Refill Mode -
Example:
REFILL K

Low Battery Mode -
Dashes Only

Shake Well Mode -
For Liquid Suspensions

Renew Mode -
Time To Replace

No Alcohol Mode -
No Alcoholic Beverages

MEDICATION TIMING DEVICE

FIELD OF INVENTION

The present invention relates to an improved medication timing system to assist in the correct administration of medication to a patient, and an overall medication dispensing system incorporating such device.

BACKGROUND TO THE INVENTION

Patient compliance with medication prescribed by physicians is a major problem, with widespread incidence of omission of doses or taking of wrong dosage or taking the dosage at the wrong time. This lack of compliance can lead to serious medical consequences.

There has previously been described in U.S. Pat. No. 4,926,572 a medicament regimen control device which prompts a patient to take the correct medication to a predetermined regimen. A liquid crystal display is used to display the number of doses of up to four medicaments. The medicaments are identified by colour and alphabet indicia provided permanently affixed to the device adjacent the liquid crystal display and which are keyed to specific containers of medication, similarly identified.

As described therein, at every dosage period at which the patient is required to take medication, a harmonious tone or beep is emitted by the device and flashing numbers appear in the LCD screen, corresponding to the number and identity of the medication required to be taken at that time. The numbers continue to flash until turned off by the patient pressing a button on the device or the lapse of a predetermined period, for example, 10 to 15 minutes. There is also described the flashing of the letter "R" at a predetermined interval to warn of the necessity to refill one or more of the prescriptions for the identified drug. To enforce this and other messages (12 or more), the word "REFILL" appears on a rectangular message board at the bottom of the medication display.

This prior art medicament regime control device is somewhat limited in its application to the problem of ensuring patient compliance with a predetermined regimen of medication. The LCD display is capable of providing information relating to four medicaments only, whereas many patients, particularly the elderly, require greater numbers of medications. In addition, the only other function described for the LCD screen in this prior patent is to display the necessity to refill a prescription for a specific medicament. Further, the identification of the individual medicament is by colour-coded alpha characters which are permanently displayed by attachment to a structural element of the device. There remains a need for a more sophisticated medicament regime control device and overall system to ensure patient compliance with a medicament regimen.

SUMMARY OF THE INVENTION

In accordance with one aspect of the present invention, the LCD display or other display means mounted with the upper face of a housing is arranged as a plurality of individual displays arranged in a first row of side-by-side displays each adapted to selectively display individual and different alphabetic letters and a second row of side-by-side displays aligned with the individual displays of the first row and each adapted to selectively display individual numerals therein. An electronic circuit means is located within the housing and is operatively connected to the display means for controlling interchangeable and selected messages conveyed by at least one combination of an alphabetic letter in a display in the first row and a numeral in an aligned display in the second row, including a message corresponding to the number of units of medication of selected ones of different medicaments.

In this aspect of the present invention, therefore, both the identity and dosage of the medication are selectively displayed in the LCDs, thereby avoiding any misreading of the identity of the medicament, which may be the case with the permanently-displayed indicia identifying the medicaments in the prior art device of U.S. Pat. No. 4,926,572.

In accordance with a second aspect of the invention, the LCD display or other display means associated with the upper face of a housing has a plurality of individual displays arranged in a first row and a second row of displays adapted to selectively display individual numerals therein. An electronic circuit means is located within the housing and operatively connected to the display means for controlling interchangeable and selected messages conveyed by a numeral in at least one of the displays in the first and second rows, including a message corresponding to the number of units of medication of selected ones of different medicaments.

By providing two rows of numeral displays in this aspect of the invention, greater numbers of medicaments may be provided for than in the prior art device of U.S. Pat. No. 4,926,572, for example, two rows each of four displays. The identification of the medicament in this aspect of the invention may be by permanent alphabetic display of the identification of the medication by indicia on the upper face adjacent individual ones of the displays in the first and second rows, as in the prior art device of U.S. Pat. No. 4,926,572. However, preferably the identification of the medicament comprises the arrangement of the first aspect of the invention described above, so that the identification of the medication is selectively displayed.

In this preferred embodiment of this second aspect of the invention, the display means further comprises a third and a fourth row of displays each adapted to selectively display individual and different alphabetic letters, individual displays in the third row being aligned with individual displays of the first row and individual displays of the fourth row being aligned with individual displays in the second row. The electronic circuit means further controls interchangeable and selected messages conveyed by at least one combination of an alphabetic letter in a display in said third and fourth rows and a numeral in an aligned display in said first and second rows respectively.

The device of the present invention also may be provided with the functions of a watch. Accordingly, the electronic circuit means may further control the display of a representation of the time of day and/or time of month in the display means. Furthermore, in this embodiment all indicia relating to medication and dosage completely disappears when the device is operating in watch mode, so that the device appears to be a normal watch. This avoids any embarrassment or self-consciousness on the part of the wearer which may otherwise result from someone seeing the display medication timing reminder device display thereby leading to prying questions, etc.

In a third aspect of the invention, the display means associated with the upper surface of a housing has a plurality of individual displays arranged in a first row of displays each adapted to selectively display individual numerals therein and in a second row of displays displaced from said first row each adapted to selectively display individual alphabetic letters or other symbols. An electronic circuit means within the housing is operatively connected to the display means for controlling interchangeable and selected different messages conveyed by a numeral in a display in the first row and a combination of alphabetic letters or other symbols or displays in the second row.

This arrangement permits separate messages to be conveyed by the two rows of displays simultaneously, a capability not possible with the prior art device of U.S. Pat. No. 4,926,572.

This arrangement may be combined with a permanent alphabetic display of the identification of the medication by indicia on said upper face adjacent individual ones of the displays in the first row, as described in U.S. Pat. No. 4,926,572. Preferably, the identification of the medicament comprises the arrangement of the first aspect of the invention described above, so that the identification of the medication is selectively displayed. Further, the arrangement of this third aspect of the invention may be combined with that of the second aspect of the invention, to provide two rows of displays for numerals.

According to yet another aspect of the invention, an integrated pharmacy-based system is provided for programming the medication timing device of the present invention. In this embodiment, a personal computer (which may be the usual pharmacy computer used to fill prescriptions, or a separate stand-alone PC) is provided with software for receiving information concerning the patient's initials, time of day to begin medication, drug identification, medication timing, size of prescription, and any cautions associated with the prescription. The pharmacy computer then translates the received information into a serial data stream which is downloaded to a remote data transfer device, referred to herein as the "smart box". This "smart box" comprises a main processor board, a "personality" read only memory (ROM) for interpreting data received from various computer formats (IBM, PC compatible, Apple Macintosh, etc.), an input/output buffer and a data control link. The medication timing device is programmed via the "smart box" through the data control link, with the information referred to above which has been loaded into the pharmacy computer. Thus, according to this aspect of the invention, the pharmacist, physician, etc. is provided with an integrated unit by which the patient's medication timing device may be fully programmed with appropriate information relating to a plurality of prescriptions (e.g. when to take the prescription, contra-indications of the prescription, when to re-fill the prescription, etc.)

BRIEF DESCRIPTION OF DRAWINGS

FIG. 4D shows a detail of a chamfered slot in the tray through which a function button of the medicament control device protrudes when installed in the portable medication manager;

GENERAL DESCRIPTION AND ADVANTAGES OF INVENTION

Figure 1C:
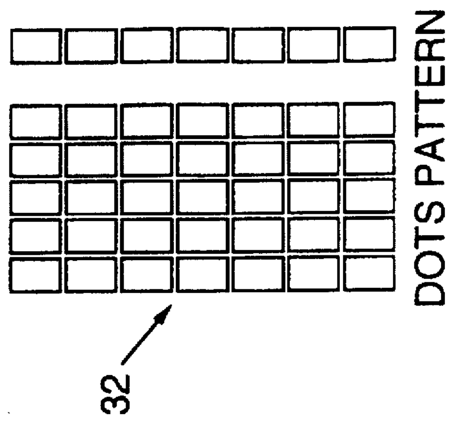
FIG. 1C is a detail view of dot matrix display portion of the device in FIG. 1A.

The present invention is directed towards the provision of a complete patient reminder system, for those taking a number of prescription drugs, that obviates many of the deficiencies of prior art devices, and the development of a high tech device that does not impinge on the time and abilities of the physician or pharmacist to program the unit for the patient.

One aim of the product of the invention is to free-up the ultimate consumer or user so that they are not required to read and study any complex instruction manual and then try to program their own medication reminder device.

The medicament regime control device or medication reminder unit of the invention is designed to accompany the patient very naturally at all times so that when the unit is automatically activated it can benefit the patient at every medication period throughout the entire day. Furthermore, the invention is also designed to service patients who are required to take anywhere from one to eight different medications during the course of any 24 hour period. Studies have shown, with the seniors population especially, that 27% of those taking medication take more than 4 drugs in their daily regimen.

In addition, the device of the invention (herein termed as "Medi-Prompter") assists the patient in a multitude of different ways in order to approximate as closely as possible the services of a personal medication nurse. Briefly, these "services" would include all of the following:

(a) The programmed unit will issue a friendly beeping sound at every medication period at which the patient's medication is due. To accommodate those with hearing deficiencies, the beeping tone is created by a vibrating piezo-electric device which is mounted in close contact with the patient's skin so that the patient can feel the vibrations. Once the beeper has attracted the patient's attention, it can be manually shut off by the patient, quickly and easily, by pressing a button on the device.

(b) As will be described below, the patient then is informed, clearly and visually, which of the eight possible medications are to be taken at any one medication period. This is accomplished as follows: From the moment each prescription drug is filled in the pharmacy, it is assigned a unique Alpha Indicator (from A to D and J to M) which helps identify each distinct drug, on the prescription label and on receipts etc. from the pharmacy. The unique identification is automatically recorded in the pharmacy, together with the name and strength of the drug in the patient's personal computer record. The DIN number or other official designation of the drug also is recorded for positive identification. The reason an Alpha Indicator is used instead of a number is to avoid any confusion that might arise in the mind of certain elderly patients as to whether the numeral identifies the medication or the number of doses. If drug C in the patient's regimen, for instance, were designated as drug number 3 the patient might think that he or she is required to take 3 of that particular drug at a given medication period. Potentially this may have disastrous results for the patient. An example will serve to illustrate this feature. Assume that a given patient is taking six different medications during any 24 hour period. At one of the medication periods, it may be that only four of these drugs are to be taken. Of the six medications (A, B, C, D, J, K) only A, C, D and K are to be taken, at 12 noon for example (see FIG. 3B). On the dial of the medication prompter the four letters A, C, D and K light up clearly (each one inside the outline of an arrowhead) to indicate which drugs are to be taken at that medication period. This medication mode remains on display for up to 10 minutes, unless manually shut off by the patient to indicate that the drugs for that medication period have already been taken.

Figure 3A:
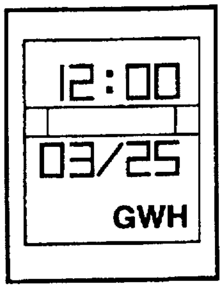
FIGS. 3 comprises parts A to K and shows different operating modes of the display for the medicament regime control device, wherein (A) depicts time and date mode, (B) depicts medication mode, (C) depicts food reminder mode, (D) depicts no dairy mode, (E) depicts do not take mode, (F) depicts unusual mode, (G) depicts time for refill mode, (H) depicts shake well mode, (I) depicts no alcohol mode, (J) depicts low battery mode, and (K) depicts renew mode.
Figure 3B:
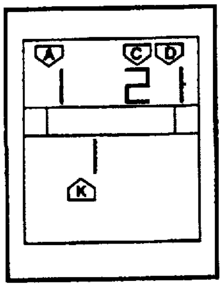

(c) In (b) above, there is described how the medication prompter informed the patient which drugs were to be taken at a given medication period. In addition to this information, the device also informs the patient as to the number of doses to be taken of each identified drug A, C, D and K as indicated by the numeral displayed vertically adjacent the Alpha Indicator (FIG. 3B). This number may pulsate off and on and informs the patient as to number of tablets, capsules etc. to be taken of the drugs specified for that period. One (dose or unit) may be a capsule, a tablet or teaspoon (of some liquid medication) or even an injection of a specified liquid, such as insulin. Each of these dosage forms relate back to and are clearly specified by the doctor's prescription and the prescription label.

The medication mode display discussed above (FIG. 3B), may pulsate off and on for 10 minutes, unless shut off manually by the patient with the press of buttons on opposing sides of the prompter. This time frame allows the patient adequate time to take the medication, as prescribed, and then shut off the medication mode display.

At this point, it will be appreciated that:

(a) The patient has been informed, right on time, that another medication period has arrived and there are drugs to be taken at that time;

(b) The patient is immediately informed which of the drugs in his or her regimen are to be taken, and identified clearly by their Alpha Indicator.

(c) The patient is shown clearly how many of each are to be taken, in accordance with the physician's written instructions.

Figure 3C:
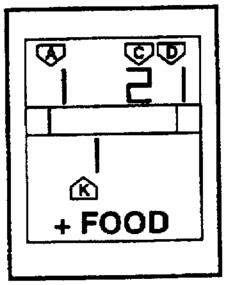
Figure 3D:
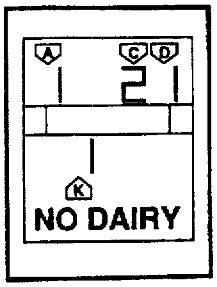
Figure 3E:
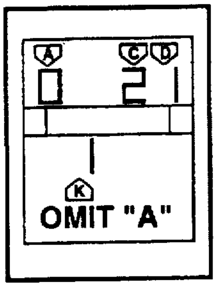
Figure 3F:
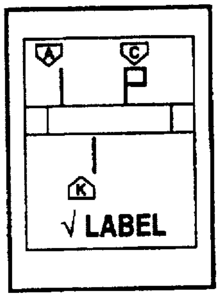
Figure 3G:
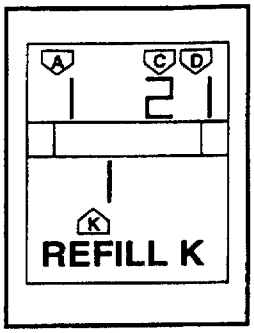
Figure 3J:
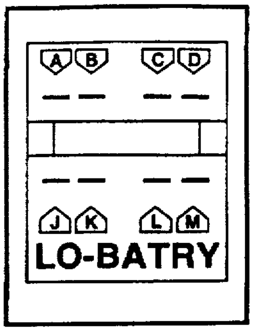
Figure 3H:
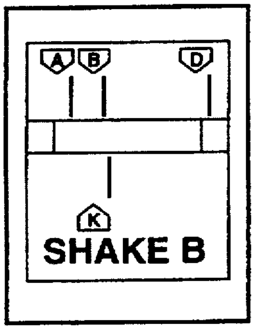

In addition, the device of the invention is able to provide further advantages and benefits in the efficient use of the drugs and for the well-being of the patient. For best results certain drugs are taken with food, others without food. When the Medi-Prompter, i.e. the medicament regimen control device of the invention, displays in the medication mode, the patient also may be informed which of the several drugs to be taken are to be ingested with food or a glass of milk (FIG. 3C), which ones without dairy products or alcohol (FIGS. 3D and 3I), these messages being displayed via a dot matrix display below the lower row Alpha Indicator. This display may also provide the user with a prompt to shake the medication (eg. liquid medication in suspension), before ingesting (FIG. 3H).

The device of the invention may accommodate unusual requests from the physician for the patient. If drug 'C', for example, involves special dosage instructions from the physician, a 'P' may be displayed adjacent to the 'C' rather than a number indicating how many capsules are to be taken and the message✓LABEL is displayed (FIG. 3F). This implies that the patient is to consult the pharmacist's label on the vial to observe the special instructions from the doctor. These special instructions might, for example, be as simple as Take 1 ½ tablets with food. As soon as a 'P' appears the patient must refer to these special instructions and follow them at that dosage period.

The device of the invention may warn a patient that, NO tablets or capsules of a designated drug are to be taken at the usual dosage period. The physician may, for example, prescribe a certain type of birth control pill which is taken for possibly 21 days and during the next 7 days nothing is to be taken. In such cases, a 'zero', ('0') appears on the screen adjacent to the appropriate Alpha Indicator, and the message OMIT "A" is displayed (FIG. 3E) showing that no medication of the type "A" is to be taken at that particular dosage period.

Studies have shown that a large number of patients, for a variety of reasons, refrain from refilling their prescription when the initial 30 day supply runs out. In many cases, such patients are chronic care cases who may experience life threatening situations, if the prescription is NOT refilled. In some cases, the physician does not make these instructions clear to the patient or the patient overlooks the instructions. In other cases, the patient is feeling so much better after the first 30 days that he or she intentionally forgets. The expense aspect of a prescription refill may also be an important negative consideration.

The device of the invention is able to ensure that the physician's written instructions are transmitted into the Medi-Prompter program and the patient is appropriately reminded to refill a specific prescription, for example, five days before the original prescription runs out. If drug 'K' is to be refilled before the 30th of the month, then beginning on the 25th day of the month, an the message REFILL K is displayed on the dot matrix display below the lower row of Alpha Indicators (FIG. 3G).

The Medi-Prompter is able to inform a patient when the battery of the unit is running low, in order to avert the potential for malfunction or non-function of the device. Rather than having repair personnel or non-experienced persons prying open the unit for battery replacement (with potential for damage), it is preferred to construct the device to be of low cost and totally replaceable. In so doing, there is obviated the potential hazard to the patient as a result of damage and attendant malfunction of the Medi-Prompter.

In the event of a low battery condition, the display adjacent to the Alpha Indicators pulsates intermittently with dashes (–) in all eight locations. Also, on the 'message board' will appear the following LO-BATRY to further inform the patient that the medication prompter should be replaced within the next 5 days (see FIG. 3J).

Figure 3K:
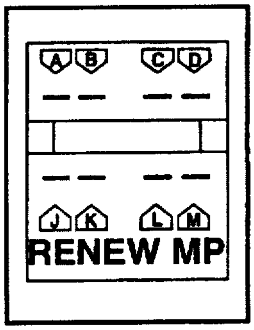
Figure 3I:
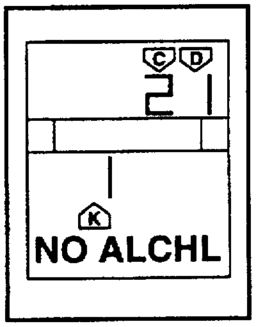

To further clarify the message to the patient, a second message may alternate with the one above which may read RENEW M.P (FIG. 3K).

One embodiment of the invention guards against possible mix-ups in the home or elsewhere where the medication prompters may be worn by several members of a family or by numerous patients in a nursing home. The patient's name or initials are displayed on the front face of each device as a safeguard against possible confusion, when the device is functioning in time and date mode (FIG. 3A). The strap colour on the medication timer can also be varied and distinctive to each patient as the need arises.

The device of the present invention also has the capability of full identification as it is plugged into the pharmacy interface data transfer device (smart box) in the down loading mode. The name and address of the patient can readily be checked, as well as all details related to the name and telephone number of the physician, name and DIN number of the drugs etc.

The device of the invention provides the patient, pharmacist and physician with a medication prompter which is reprogrammable or simply deletable. The doctor may wish, for example, to change drug B to another drug, discontinue the drug or modify the dosage regimen for the patient. Any of these modifications can be accomplished as required through the use of the smart box in the pharmacy. Any medication program can be quickly and automatically adjusted for the patient in accordance with the physician's latest instructions to the patient.

The device of the invention may be reprogrammed when a medication program is completed and replaced with a totally new program for another patient. This can be accomplished on the pharmacy computer linkage system by downloading one and uploading the new drugs and program into the same medication prompter. This is an economy feature for the user/owners that assists the budget in some families where neither patient is chronically ill.

Figure 2A:
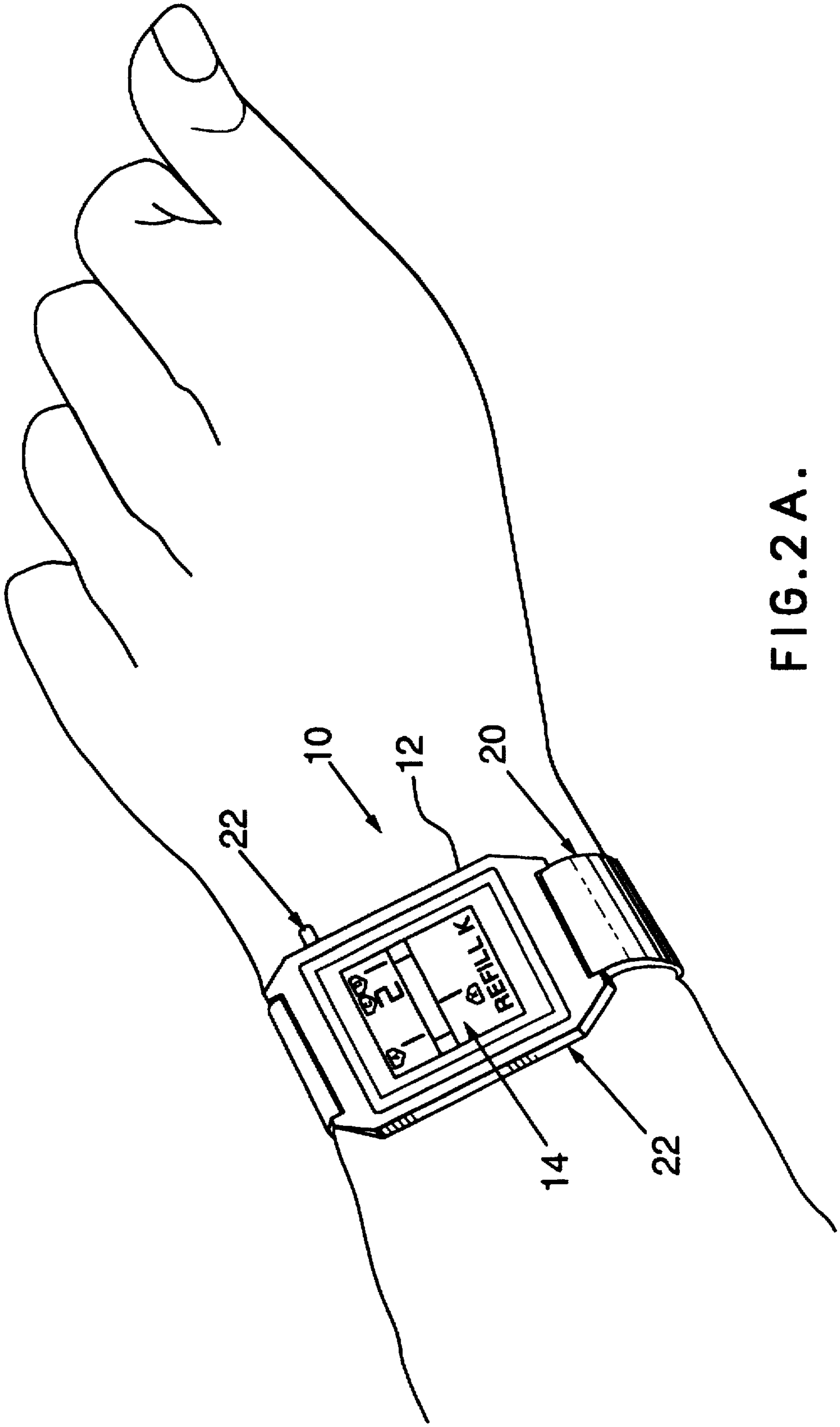
FIG. 2A shows the device of FIG. 1A worn on the wrist of the person taking the medication or responsible for another person taking the medication.

While this invention is primarily a medication timing device of sophisticated, high tech design as is apparent from the above description, it is also designed to function in the non-drug mode as an attractive and useful time piece for the patient. After each medication mode, the display on the medication prompter switches over automatically, after 10 minutes, to the clock mode (FIG. 3A). By the quick pressing of two opposing buttons on the Medication Prompter (FIG. 2A), the clock mode reappears whenever the patient so signifies. In the time mode, the personalized initials of the patient also are displayed (see FIG. 3A) which adds an air of prestige to the product as well as the added feature of patient identity and safeguard against dangerous mix-up where several users reside under the same roof.

In addition to the functions provided above, important additional information may be stored in an internal memory of the medicament regime control device, which may include one or more of the following:

(a) Important information relating to patient's medical history, (b) Name(s) of physicians(s), telephone number etc., (c) Name of next-of-kin and telephone number, (d) Who to contact in case of emergency and telephone numbers, (e) Drugs etc. to which patient is known to have allergies, (f) A cross check to see if any drugs prescribed to the patient have any adverse interaction.

(g) Simplified hardware and software that would make it possible for patient's physician to download information from the medication prompter to review or double check the patient's existing dosage regimen. He would then write out a script for the pharmacist if there are any modifications to be made in the dosage regimen. In this way, he would also know if his patient is being treated by another physician who may have even prescribed a different medication for the same ailment, (known as 'double dosing'). This may prevent double medicating and further safeguard the patient.

These features are all designed to enhance the services of the device of the invention to the patient and to further protect his or her well being during normal times and also in cases emergency. If a patient is wearing this medication prompter at the time of a serious accident, or other emergency, the ambulance staff or hospital staff, would be able to download quickly and easily obtain life saving information from this device. A wealth of information would be at their finger tips concerning patient's medical history, allergies, physician's names and telephone numbers, next-of-kin etc. In addition to the list of drugs would be the patient's dosage regimen. Those in attendance would know immediately if they are dealing with a diabetic, epileptic, heart patient etc. Knowledge of all the above at the right time may easily save the person's life.

The device of the invention may be used not only for the prompting of the proper taking of medication but also may be used by patients who are taking therapeutic vitamins, minerals and beneficial herbs as supplements to their regular diet. These substances may all be classified under the heading of Preventative Medicine and may be equally important as any other prescription drug in terms of the well-being of the patient. The pharmacist may have one or more separate entries for these on the medication timing device in order that the patient may take these substances at convenient times on a regular daily basis.

The present invention provides a convenient vehicle for assisting the caregiver rather than the patient to simplify the correct administration of drugs to the elderly, impaired, or bed ridden patients. A mother of a chronically ill child would benefit greatly, as this device is worn by her and she is reminded at each dosage period to administer the correct medications to the patient. A nursing assistant who is providing aid to senior citizens, handicapped or chronically ill persons would benefit greatly from this device, and indirectly so would the patient.

The device of the invention may assist the medication nurse on a hospital ward who may be giving care to two or three dozen patients. To do so requires much time in consulting charts, records, and copious paper work. A slightly modified version of the invention assists the nurse significantly in automating the system for her to a great extent as a medication timing device is programmed by the pharmacy and issued for each patient on the ward. The nurse may use a "Meds Tray" which has pockets for each patient's medication and a receptacle to hold each patient's medication timing device adjacent to his or her medication. These units may be programmed to remain in the medication mode for an hour instead of the usual 10 minutes, or until shut off by the medication nurse.

An added feature of this invention is to provide indicia and information as bold and as legible as possible bearing in mind the size limitations of this device which is worn by the patient. Colour contrast may be used effectively to assist with legibility.

To further assist with legibility and reduce confusion for the patient, in a preferred embodiment of the invention, only the Alpha Indicator for the drugs which must be taken at a given medication period is displayed at that specified time. A patient may be taking five different medications but at 12 noon might be required to take only four of the five, say drugs A, C, D and K (see FIG. 3B). In this case, only those four alpha indicators (and surrounding arrowheads) will be displayed with the appropriate dosages for each.

If a patient were taking five drugs at a given period then all five Alpha Indicators would display. If eight were to be taken then all eight Alpha Indicators would be displayed.

To further assist those who are visually handicapped, a clip-on magnifier may be provided or a lens of special design to magnify the indicia that is important to the patient.

The Medi-Prompter device of the invention significantly relieves the stress and anxiety that many patients are placed under when they have to manage daily to adhere to a dosage regimen for half a dozen or more different drugs at, say, five different dosage periods during the day and night. The stress on elderly patients living on their own gives great cause for concern and anxiety. In some cases fear and paranoia set in and further complicate the medical conditions for which they are being treated.

Our device, with its fully automated program and multitude of helpful features for the patient is the closest thing to having a private medication nurse in attendance. A great responsibility is lifted for many patients who desperately need the kind of help that would be afforded by this unique invention.

DESCRIPTION OF PREFERRED EMBODIMENTS

Referring to the drawings, FIG. 1 shows the display portion 14 of a medicament regime control device 10. The device 10 is received in a housing or casing 12. (FIG. 2) of generally rectangular shape. The housing 12 may be provided with strap attachment anchors 16 of known design, for the attachment of a strap 20 (FIGS. 2A and 2B) to the device 10.

Push buttons 22 are provided at each side of the housing to permit displayed messages to be switched off when read. A single push button may be employed but it is simplest to the user to have two such buttons 22. Such buttons also may be employed to alter time and date displays.

The display portion includes a plurality of liquid crystal displays which display selected information in accordance with information programmed into the device 10, as discussed in greater detail below. The liquid crystal displays (LCDs) are activated in response to control signals generated by a microcontroller 51 forming part of the device 10 (discussed in greater detail below) and which are received by the display portion 14 via upper and lower contact pads 33 and 34. The displays are divided into a first row 24 of four side-by-side individual displays and a second row 26 of four side-by-side individual alpha-numeric LCD displays, each of which is programmed to display numerals or selected alphabetic letters. A third row 28 of four side-by-side individual displays and a fourth row 30 of four side-by-side individual displays also are provided in alignment with the respective individual displays of the first and second rows 24 and 26, each of which is programmed to display selected and different alphabetic letters, generally from A to D (row 28) and J to M (row 30). A message bar 32 also is provided on the display face 14 for the display of supplementary messages or a patient's initials in the time mode (FIGS. 3A, 3C–3K).

Figure 1B:
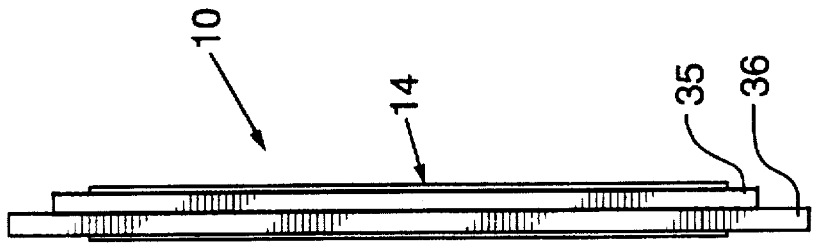
FIG. 1B is a side view of the display in FIG. 1A.
Figure 1A:
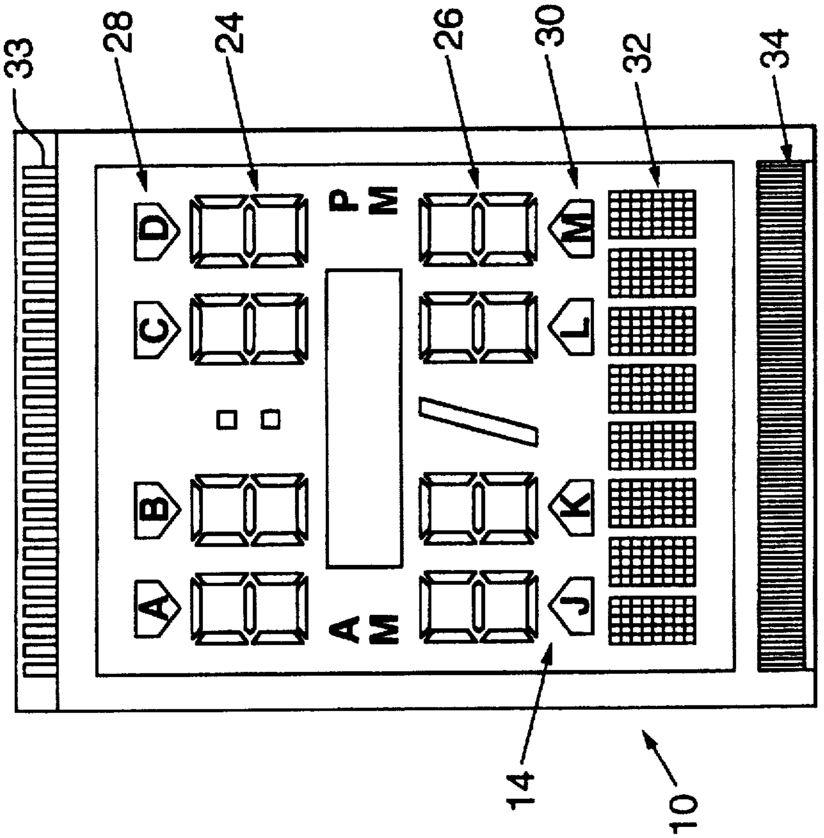
FIG. 1A is a plan view of a display or front face of the medicament regime control device, provided in accordance with one embodiment of the invention.
Figure 2B:
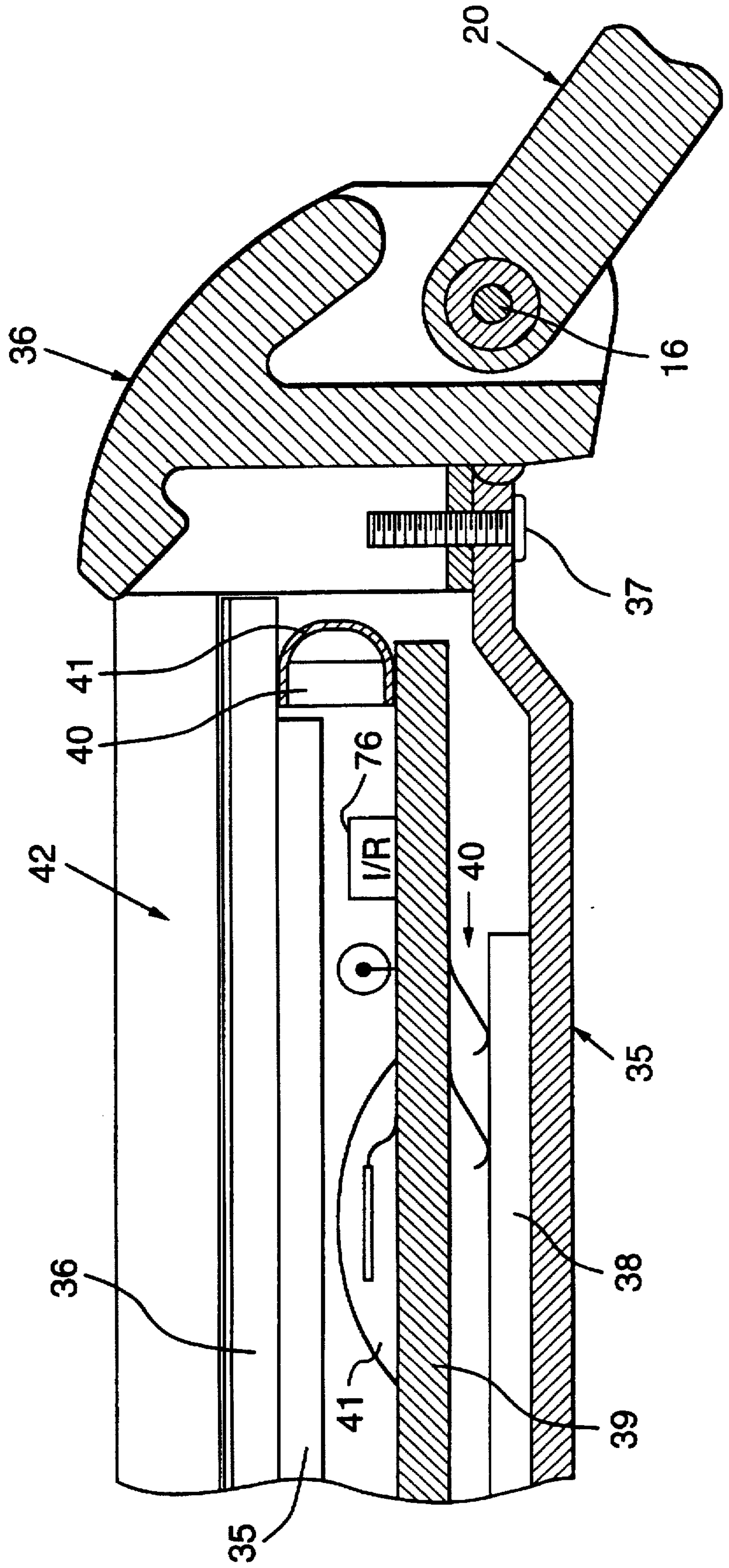
FIG. 2B is a magnified cross-sectional view of the device in FIG. 2A, showing a preferred mode of attaching the device to a watch wrist strap.

As shown in FIGS. 1B and 2B, the device 10 is of planar, generally sandwich-type construction having a metal back 35 connected to an acrylic lens 42 via screw 37, the lens 42 being snap fit connected to frame 36. A piezo-electric element 38 is mounted on the back 35 and is separated from a printed circuit board 39 via spring contacts 40. The printed circuit board 39 houses all of the electronic components, including the display portion 14, microcontroller 51 (discussed in greater detail below), infrared data link 76 (also discussed in greater detail below), etc. The display portion 14 is mounted above printed circuit board 39 and separated therefrom via a spacer 40. The basic structure of the LCD display portion 14 comprises first and second layers of glass 35 and 36, and an intermediate layer of nematic liquid, along with suitable electrodes for causing programmable molecular twisting of the nematic fluid structure, in a well known manner. As indicated above, the electrodes are connected to the microcontroller 51 on printed circuit board 39 via connectors 33 and 34. In FIG. 2B, the interconnection between the electrodes 33, 34 and the circuitry of printed circuit board 39 is via a ribbon cable 41.

Turning now to FIGS. 4, 5 and 6, various embodiments of portable medication and prompter carrying devices (hereinafter referred to as portable medication managers), are shown. In FIGS. 4 and 5, a double row device is shown comprising seven compartments 43 for storing medication to be dispensed, and a further compartment 44 for storing the medicament regime control device 10 of the present invention. Each of the compartments 43 and 44 includes an undercut locking slot 48 for receiving the lip portion 45B of the corresponding lid 46, and a further slot 47 receiving a flexible hinge portion 48 of the lid 46.

Figure 4D:
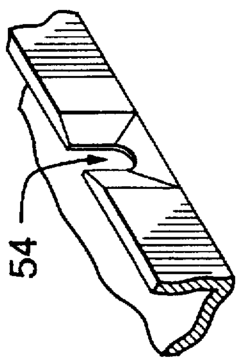
FIGS. 4A to 4D show a portable medication manager for storing the medicament regime control device and pills to be dispensed, and structural details thereof, according to another aspect of the invention, with FIG. 4A being a perspective view of a thermoformed tray with a number of recesses to receive a number of prescriptions and a medicament regime control device in respective ons of the recesses, FIG. 4B showing a lid portion for the upper half of the portable medication manager, the lower lid portion being of mirror image construction, FIG. 4C showing a close up of the lid in FIG. 4B for closing one of the recess.
Figure 4C:
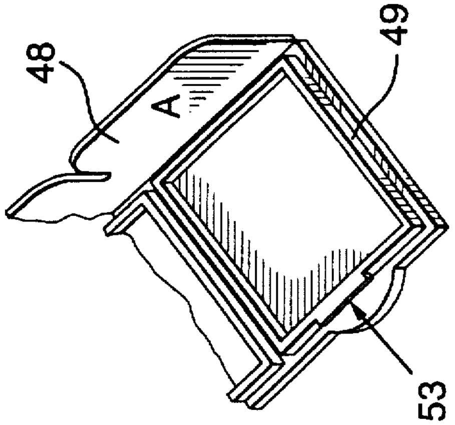

As shown with reference to FIG. 4C, the underside of the lid 46 includes an inner skirt 49 on all four sides which fits down inside of each compartment 43, 44. Furthermore, a locking tab is provided for locking the lid 46 in place over the associated row of compartments.

Figure 4A:
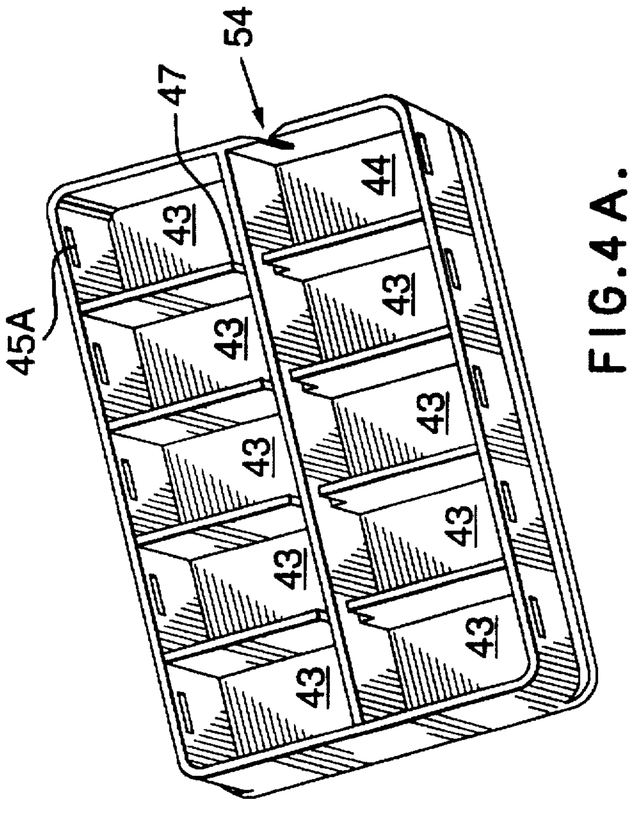
Figure 4B:
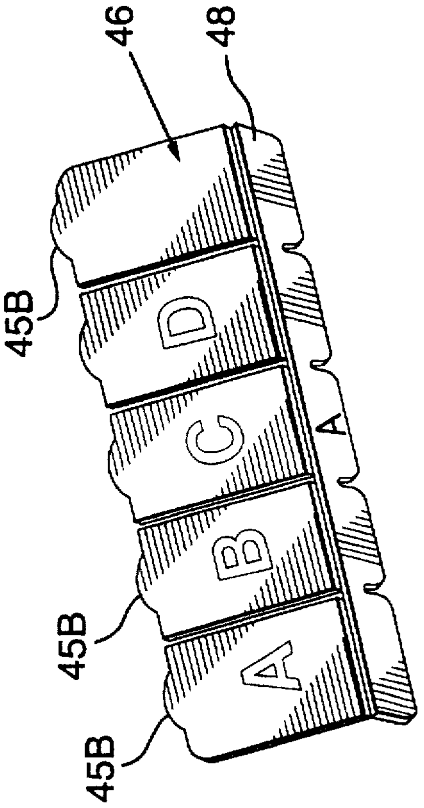

As shown in FIGS. 4A and 4D, an additional chamfered slot 54 is provided for access to compartment 44, and through which the function button 22 of device 10 protrudes. The slot 54 is chamfered to facilitate finger depression of the button 22.

The lid 46 preferably has letters A-D or J-M stamped thereon, for identifying the medication stored within relative to the medication alpha indicators on the device 10.

Figure 5B:
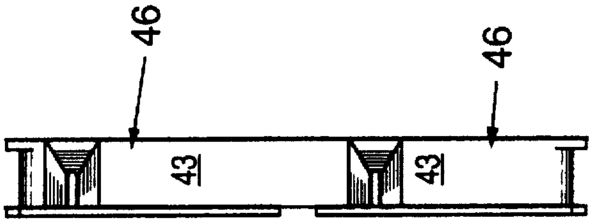
FIGS. 5A and 5B are plan view and side views, respectively, of the portable medication manager of FIG. 4 with the medicament control device carried therein.
Figure 5A:
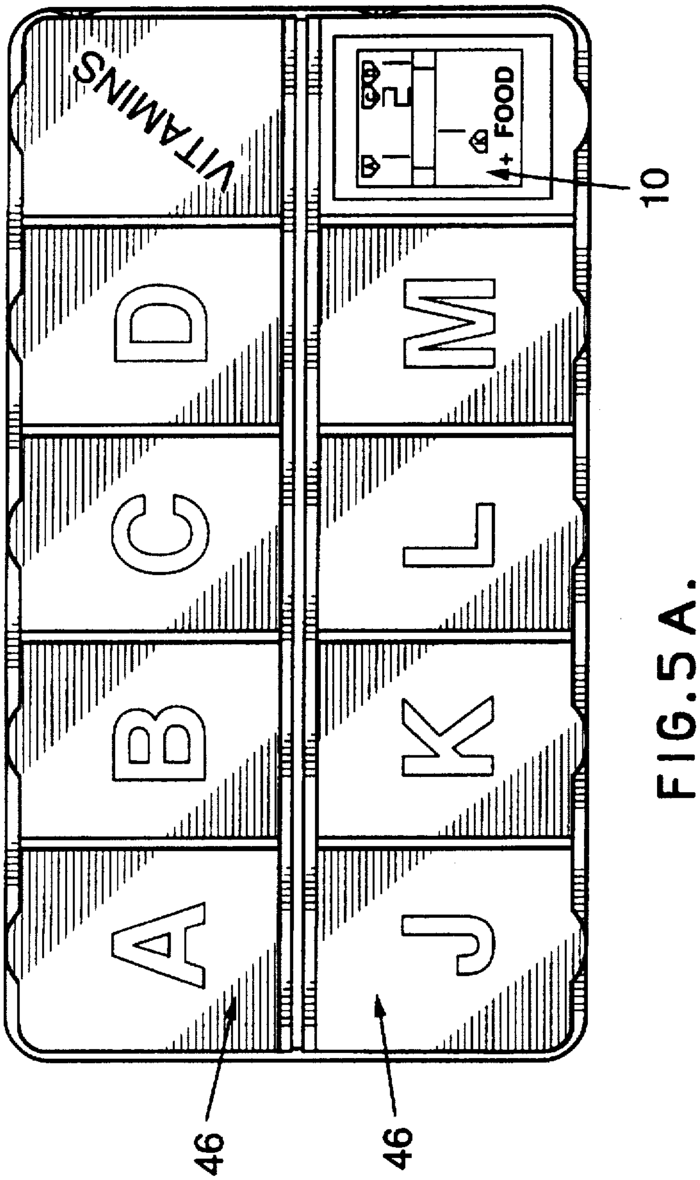
Figure 5C:
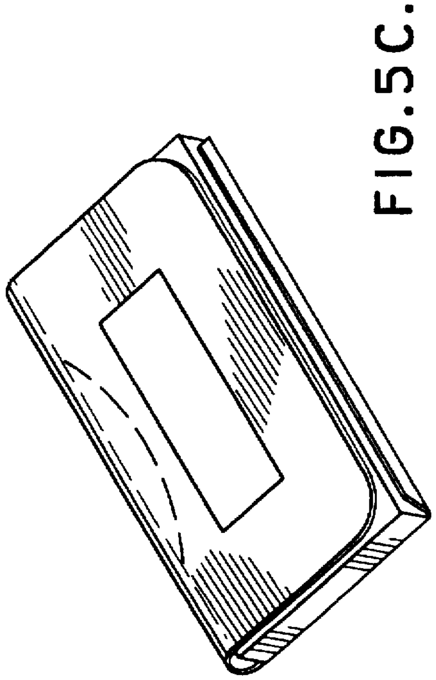
FIG. 5C is a perspective view of a carrying case for the portable medication manager.

FIG. 5A shows the portable medication manager in plan view and FIG. 5B shows the portable medication manager in cross-sectional view with the lid 46 in place. FIG. 5C is a perspective view of a suitable carrying case for the portable medication manager, so that the medication manager may be conveniently carried in a purse, briefcase, glove compartment, etc.

Figure 6B:
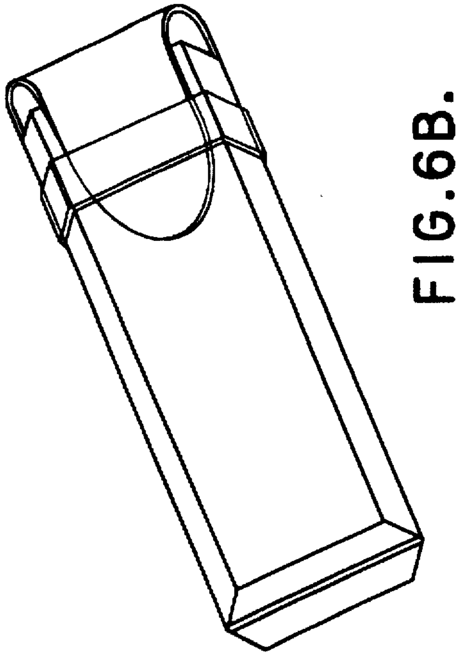
FIG. 6B is a perspective view of a carrying case for the portable medication manager of FIG. 6A.
Figure 6A:
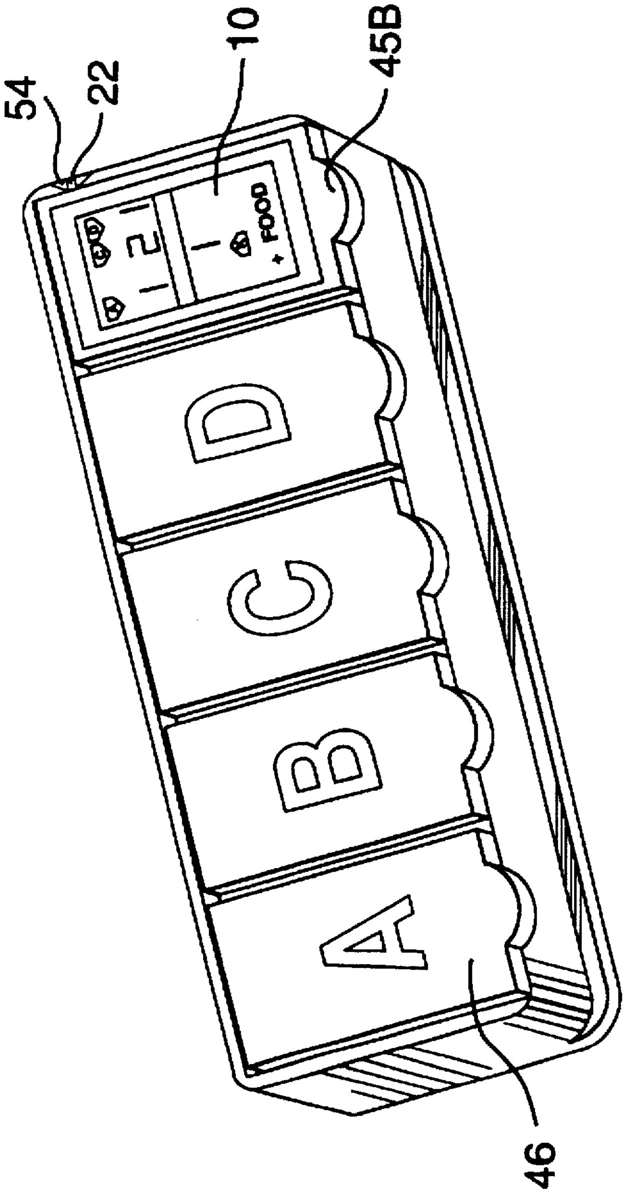
FIG. 6A is a plan view of a single-row alternative embodiment of the portable medication manager.

FIG. 6A shows a single row version of the portable medication manager, for persons who have been prescribed four or fewer medications. FIG. 6B is a perspective view of a carrying case for the single row portable medication manager, which is capable of being carried in a patient's breast pocket, etc.

Figure 7A:
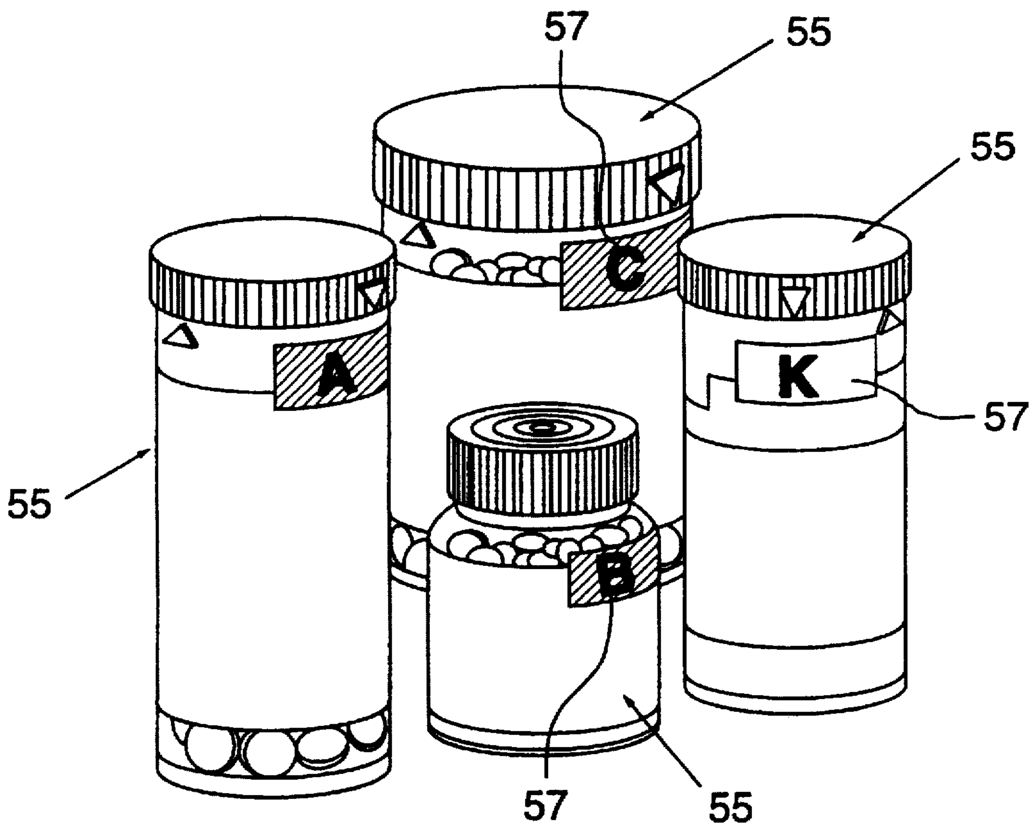
FIG. 7A illustrates distinct alphabetic identification of medication vials coded to the alphabetic display of the medicament regime control device of the present invention and FIG. 7B shows a collection of alphabetic pressure sensitive labels for application to the appropriate medication vials.
Figure 7B:
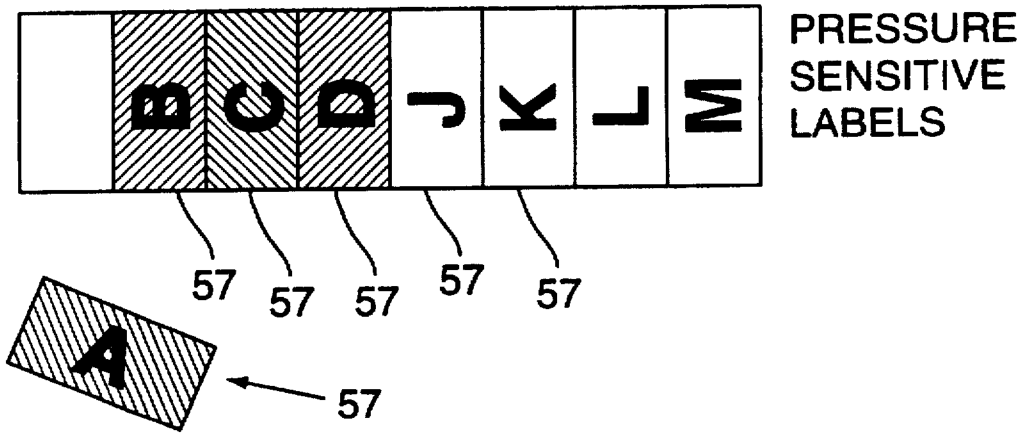

As an alternative to utilizing the portable medication manager of FIGS. 4–6, the patient may choose to continue using the standard pharmacy issue prescription vials and containers 55 (FIG. 7A), each of which may be identified by a pressure sensitive label 57 which can be applied to the container 55. The letters appearing on pressure sensitive labels 57 correspond to the alpha indicators generated by the medicament control device 10 of the present invention.

Figure 8:
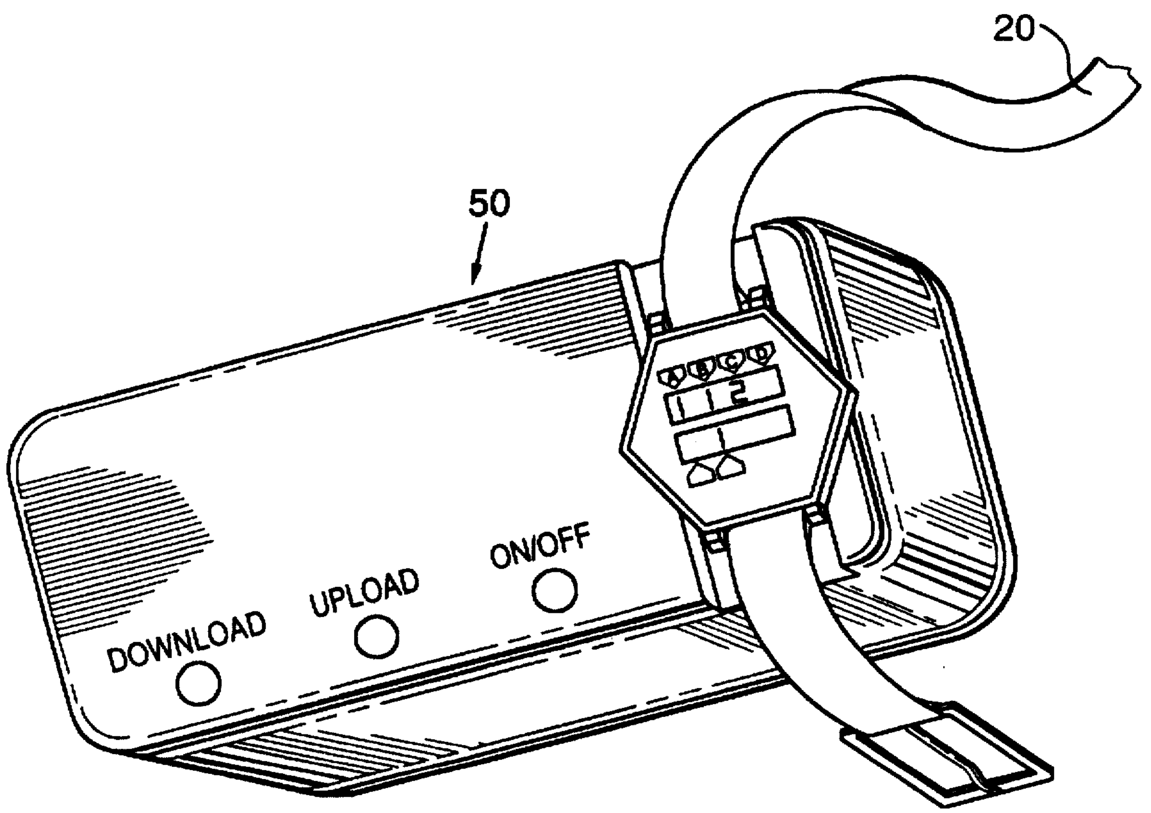
FIG. 8 is a perspective view of another embodiment of medicament regime control device, mounted to an data transfer device (or "smart box") for programming the medicament regime control device, according to the present invention.

In the embodiment shown in FIG. 8, the medicament regime control device 10 is shown in close proximity to a data transfer device 50 (ie. smart box), for. programming the device 10 with data input by the pharmacist. In this illustrated embodiment of the device 10, the message bar 32 is omitted and the device 10 is provided with two rows of side-by-side individual displays. The display face is hexagonal in shape rather than rectangular, as in the embodiment of FIG. 1, etc. The rectangular face is preferred, since additional space is thereby provided for greater legibility of medication nomenclature, additional rows of displays to accommodate greater numbers of medicaments and a message bar.

Figure 9:
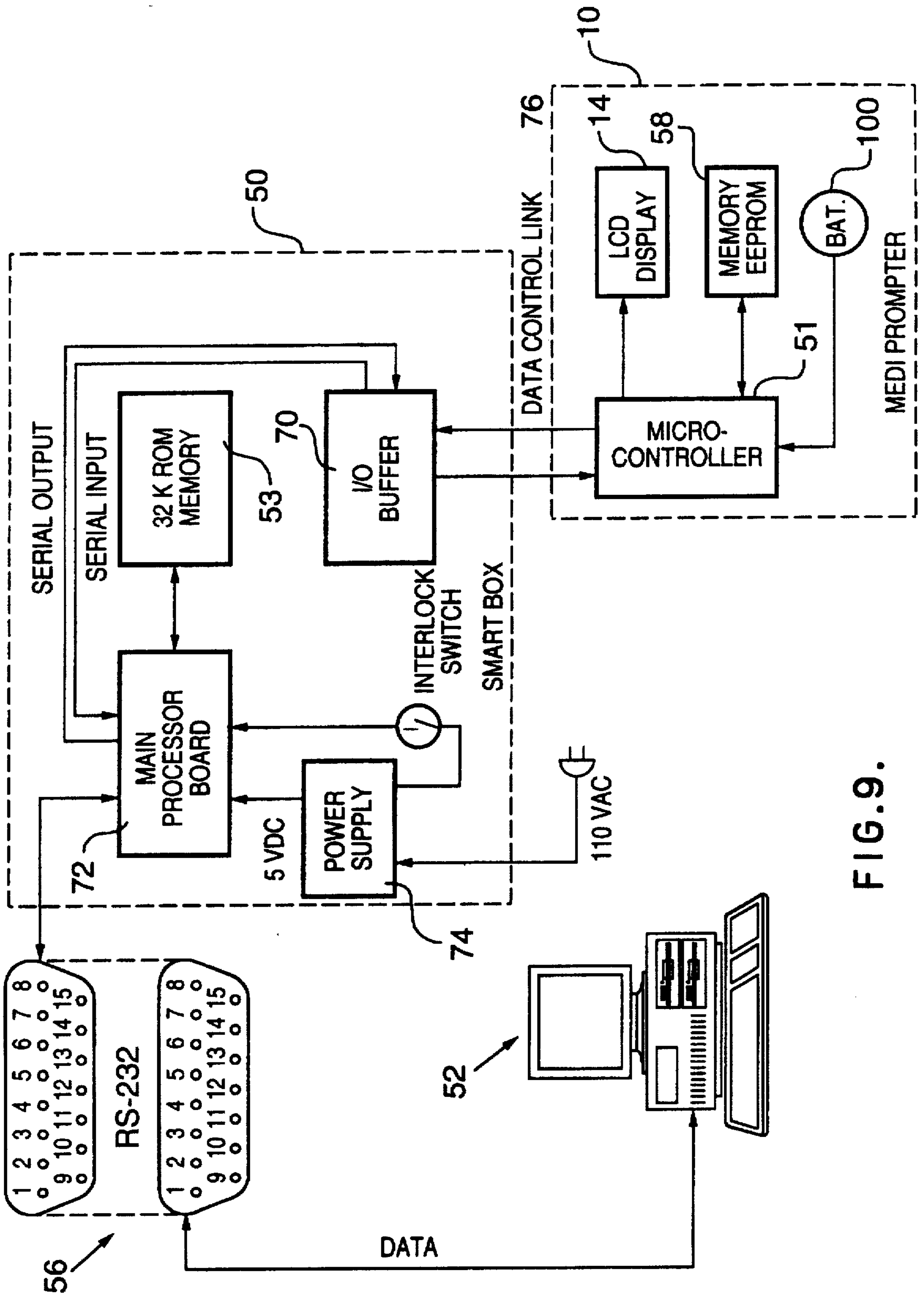
FIG. 9 is a schematic block circuit diagram showing three interrelation units of the overall system, namely the medicament regime control device, pharmacy computer and data transfer device between the pharmacy computer and medicament regime control device.

FIG. 9 shows a schematic arrangement of a data transfer device 50 (ie. smart box), for programming the medicament regime control device 10. Such a device is used by a pharmacist in conjunction with the pharmacy computer 52 to program appropriate information into the medicament regime control device, based on information provided by a physician on a prescription, and supplemented by information provided by the patient (eg. patient's initials, time patient awakes in morning, etc.).

FIG. 9 also contains a schematic block circuit diagram of the electronics housed within the medicament regime control device 10 for controlling the LCD display portion 14 and communicating with the data transfer device 50. As seen therein, the electronics circuitry of the medicament control device 10 includes a microcontroller 51 which is programmable by the device 50 through input/output interface 76. Such connection may be a probe which plugs into a suitable socket formed in the casing of the device, but is preferably an infrared device for effecting wireless data transfer. The microcontroller 51 accesses data stored in EEPROM memory 58, and in response controls the display device 14 in the manner discussed above. The electronic components of device 10 are powered by a battery 100.

The data transfer device 50 interacts with the medicament regime control device 10 through the interface 76 via an internal input/output buffer 70 which communicates with a main processor board 72, which receives power from a power supply 74. Data is fed into the data transfer device 50 from the PC 52 through a suitable connection such as RS-232 port 56.

The overall sequence of programming the medicament control device 10 is as follows with reference to FIG. 9. Firstly, a patient provides the pharmacist with one or more prescriptions to be filled, and provides the pharmacist with certain additional information such as the patient's initials, any allergies, time of day when the patient awakens, etc. This additional information may be provided to the pharmacist via a questionnaire, orally, etc. The information from the patient as well as the prescription information are then entered into computer 52, which as indicated above may be the standard pharmacy computer for maintaining information on patients and issuing prescriptions, etc., or may be a stand alone lap top PC, etc. Software running on computer 52 causes the input information to be appropriately stored, and generates data to the data transfer device 50 (i.e. smart box) via serial interface 56. The main processor board 72 of data transfer device 50 receives and modifies the data received from PC 52 for transmission to the medicament control device 10. More particularly, data transfer device 50 contains a replaceable read-only memory 53 (referred to herein as a personality ROM), for translating the data received from PC 52, irrespective of the protocol or format of the data generated by PC 52 (i.e. IBM, Apple Macintosh, etc.) to a format suitable for transmission to the medicament control device 10. The data so translated is output via data control link 76 (i.e. preferably an infrared link), through input/output buffer 70, for receipt by the microcontroller 51 of medicament control device 10. In this way, the medicament control device 10 is loaded with the relevant information concerning the patient's initials, the time to start notifying the patient of the first prescription in a given day, the drug identification, how often the drug is to be taken, how many doses have been issued, and any cautions concerning whether the drug is to be taken with or without meals, etc. This data is stored in an internal data memory (e.g. 736 by 4 bit memory). Although 'shown provided with an external memory EEPROM 58, which is useful for development purposes, in the preferred embodiment of the invention microcontroller 51 is in the form of a KS57C2616 microcontroller manufactured by SAMSUNG Electronics, which includes an internal 16K byte program memory which is permanently programmable. Once the medicament control device 10 has been programmed by the pharmacist, the device begins operating in normal operating mode, as discussed in greater detail below with reference to FIG. 11.

In the event of a requirement to re-fill one or more of the prescriptions that are being tracked by the medicament control device 10 of the present invention, the patient provides the pharmacist with his/her medicament regime control device 10, the pharmacist then downloads data from the device 10 into the pharmacy PC 52 via data transfer device 50 (i.e. data control link 76 and serial interface 56 are bi-directional). The medicament regime control device 10 provides an indication as to which of the one or more prescriptions needs to be re-filled. In response, the software running on PC 52 accesses as the patient's file, determines whether or not re-fill authorization has been provided, and if so, down-loads programming information to the device 10 via data transfer device 50, as discussed above, for restarting the prescription regime (i.e. notifying the patient when to take the re-filled prescription (and any other prescriptions not yet finished), number of doses, etc.).

The actual creation of software for the pharmacy computer 52 and data transfer device 50 is believed to be well within with scope of a person skilled in the art.

Figure 10:
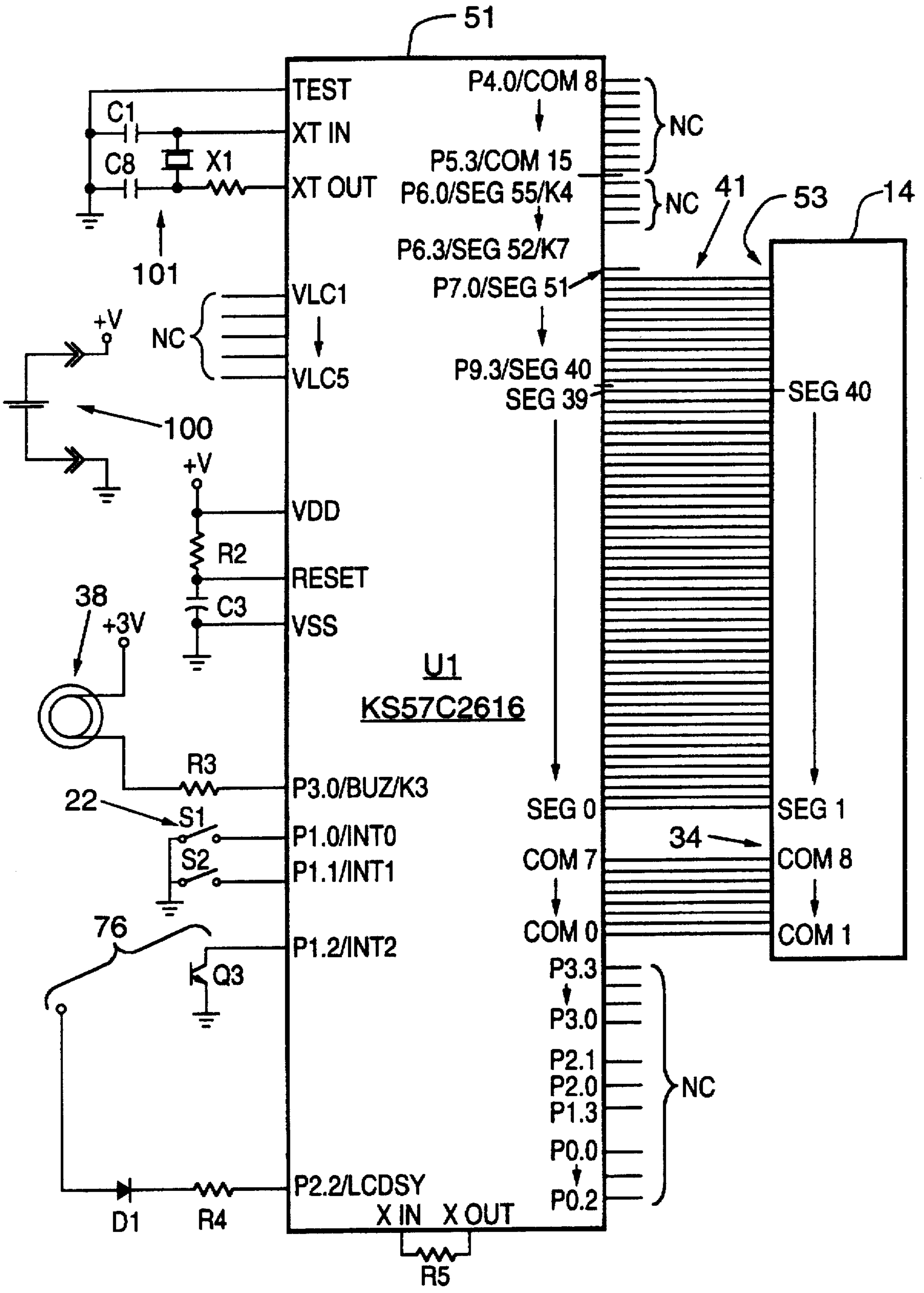
FIG. 10 is a detailed schematic diagram of the electronics portion of the medicament regime control device according to the preferred embodiment.

Turning now to FIG. 10, a detailed schematic diagram is shown of the electronic circuity incorporated in the medicament regime control device 10 of the present invention. Microcontroller 51 is preferably a KS57C2616 microcontroller manufactured by Samsung Electronics, as indicated above. The LCD display portion 14 conforms to the structure illustrated in FIG. 1. The microcontroller 51 and LCD display portion 14 are powered by a battery 100, preferably in the form of a three volt lithium cell. A clock circuit 101, including an approximately 32 Khz crystal X1, provides the necessary clock signal for operating microcontroller 51. The piezo-electric device 38, switches 22, and infrared (IR) interface 76 are connected to the microcontroller 51 in a well known manner, as illustrated in FIG. 10. The pin connections between microcontroller 51 and LCD display portion 14 for this preferred embodiment, are indicated in Appendix A to this disclosure, which also includes an indication which of the displays 24, 26, 28, 30 and 32 (FIG. 1A) are activated by signal outputs from the microcontroller 51.

Figure 11A:
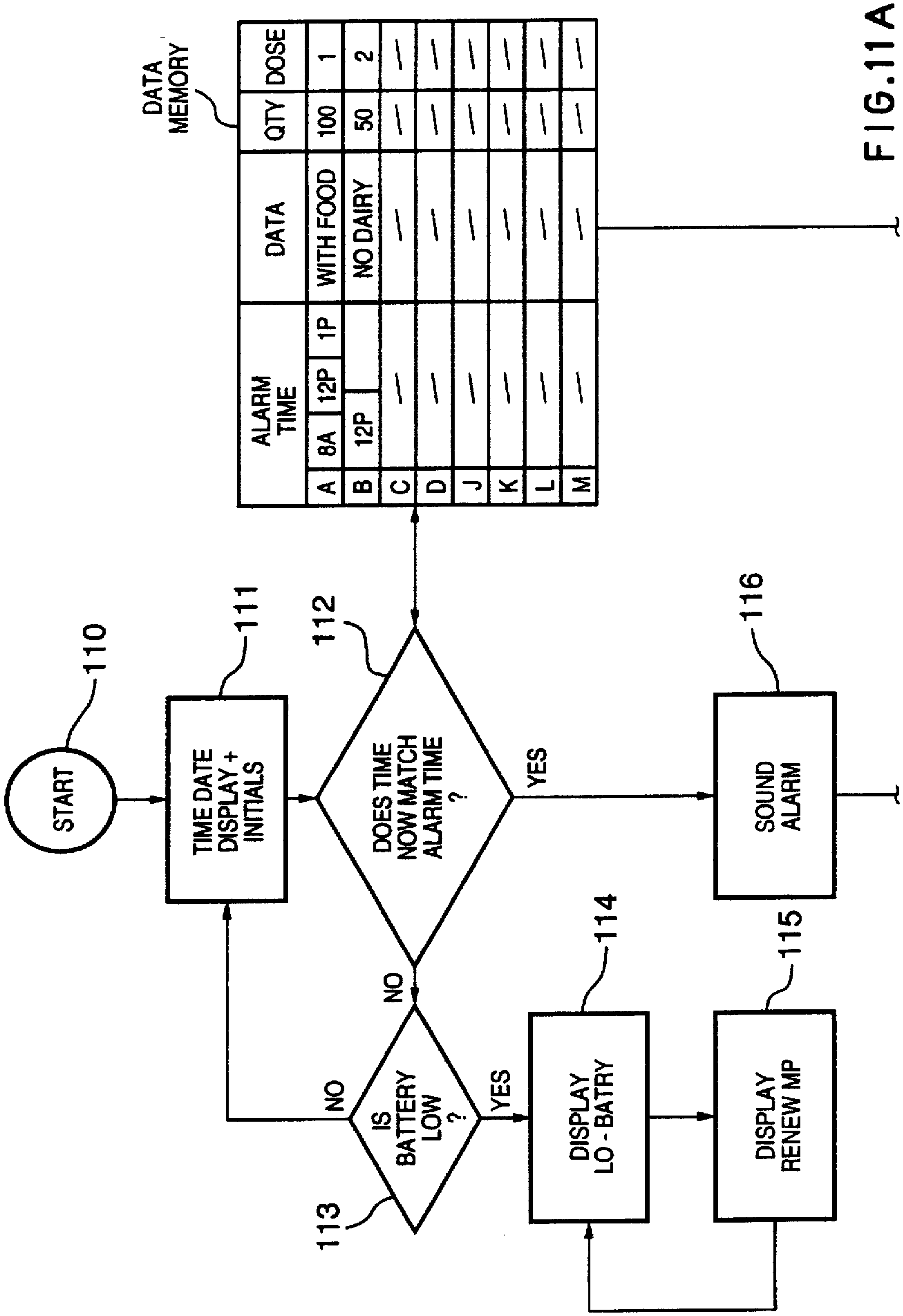
FIG. 11 is a flow chart showing the normal operating mode of the medicament regime control device according to the preferred embodiment.
Figure 11B:
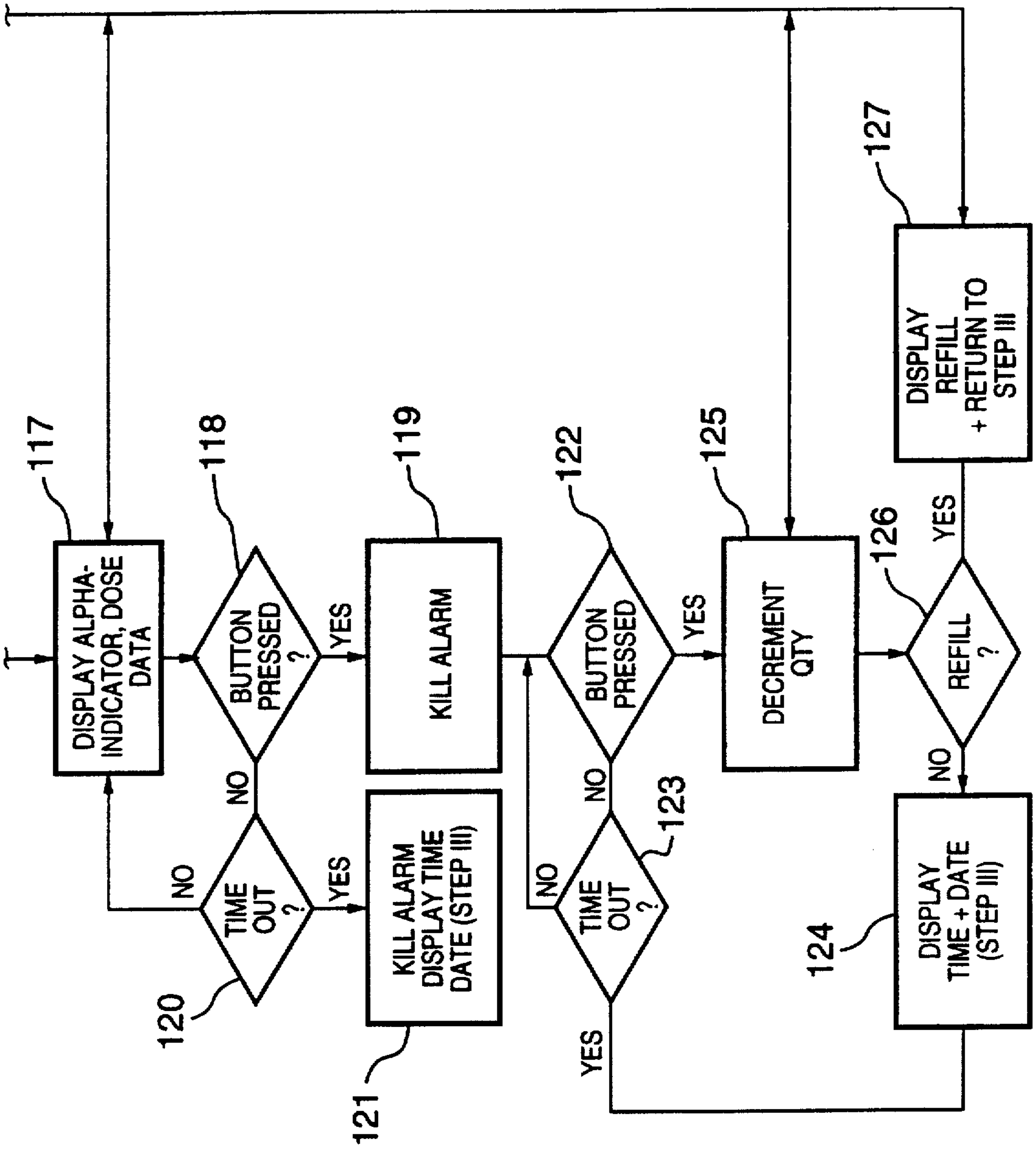

Turning to FIG. 11, a flow chart is provided showing the normal operating mode of the medicament regime control device 10 of the present invention. After the device 10 has been programmed, the software flow begins (i.e. step 110), and the time, date, and patient's initials are displayed as indicated at step 111 (FIG. 3A). The device then accesses the microcontroller's internal data memory and compares the programmed alarm times (in the example of FIG. 11, only two medications A and B have been programmed) with the present time (step 112). In the event of no match, then the device checks the battery level at step 113. If the battery level is sufficient, program flow returns to step 111. If the battery level is low, the device alternates displays between LO-BATRY in step 114 (FIG. 3J) and RENEW MP in step 115 (FIG. 3K). This notifies the patient to return to the pharmacist to obtain a new programmed medicament regime control device 10.

In the event of a match between the current time and one of the programmed alarm times (i.e. step 112), the piezo-electric alarm 38 is sounded at step 116, the display generates the appropriate alpha indicator, dose and additional data at step 117 (i.e. FIGS. 3B, 3C, 3D, 3E, 3F, 3H and 3I), in accordance with the information programmed into the internal data memory of microcontroller 51.

If the patient then depresses button 22, the piezoelectric alarm 38 is silenced (i.e. steps 118 and 119). If the button is not pressed, and an internal time out has not occurred (say 5 minutes), as indicated at step 120, program flow returns to step 117. If a time out has occurred, the alarm 38 is silenced and program flow returns to step 111 (i.e. time/date mode), as indicated at step 121.

After the alarm has been silenced at step 119, the display of alpha indicator, dosage and additional data continues until the appropriate button 22 is pressed (i.e. either a single button 22 being depressed twice, or the other button 22 being depressed in a two button embodiment), as indicated at step 122. If the button 22 is not depressed and no time out has occurred (i.e. step 123), program flow returns to step 122. If, however, a time out has occurred, then the device returns to time and date mode (i.e. step 111) via step 124.

If the button 22 has been depressed at step 122, indicating that the patient has taken the required dosage of medication, then the quantity (QTY) as stored in the internal data memory is decremented (i.e. step 125). If the decremented quantity is less than a predetermined value (say 10), then the device 10 displays the re-fill message (i.e. FIG. 3G, at step 127). If the decision at step 126 indicates that no re-fill is required, then the display returns to time and date mode via step 125.

Turning now to the embodiments of FIGS. 12, 13, and 14, various forms of carrying case are provided for the device 10 of the present invention.

Figure 12A:
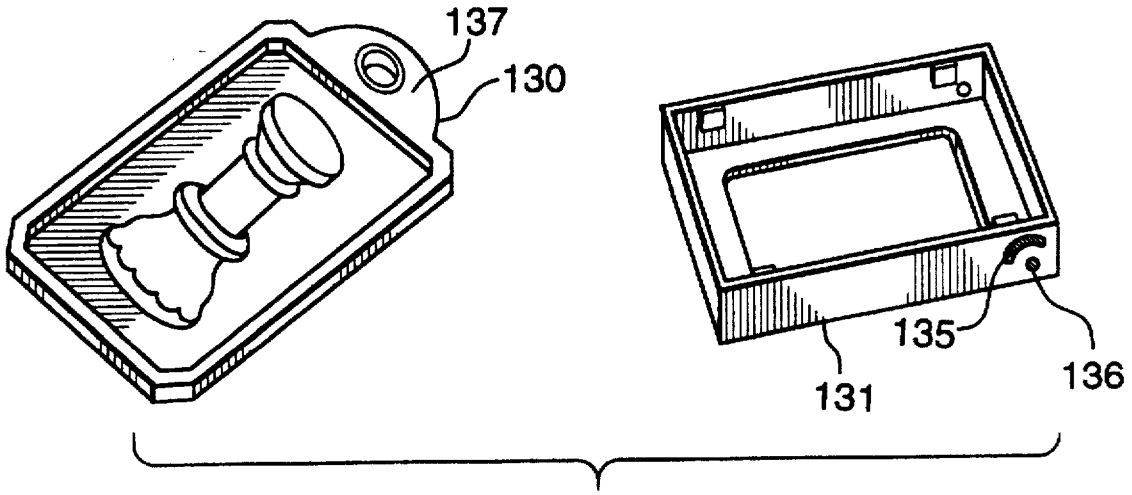
FIGS. 12, 13 and 14, each comprising parts (A), (B), (C), illustrate alternative forms of carrying case for modular snap-in carrying of the device in FIG. 2.
Figure 12B:
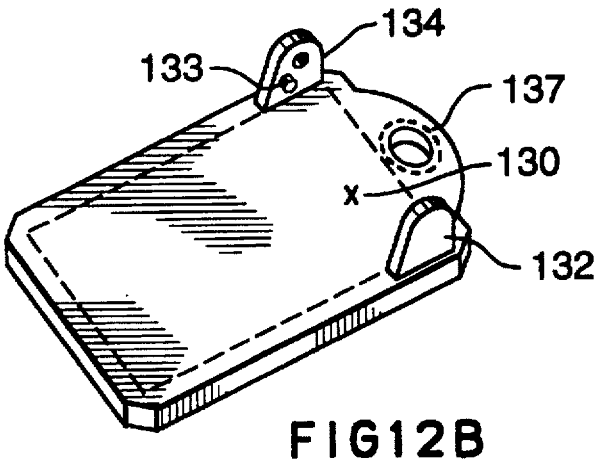
Figure 12C:
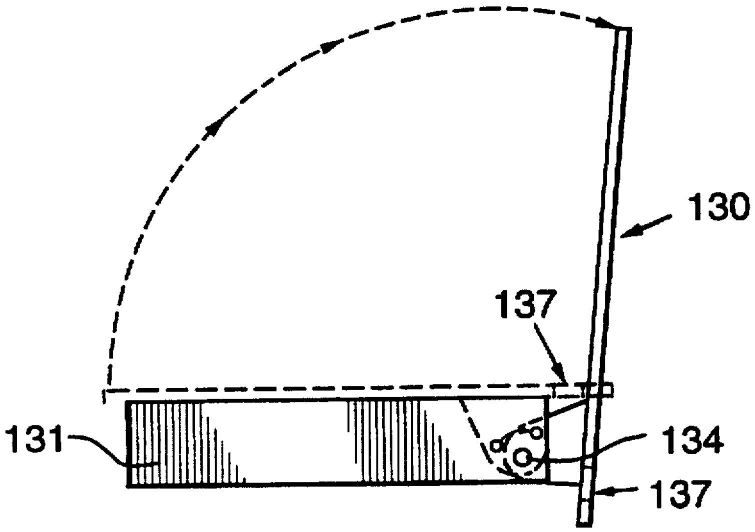

The rectangular carrying case of FIG. 12 comprises a cover 130 and bezel 131 (FIG. 12A), the cover 130 being shown in greater detail with reference to FIG. 12B, comprising a pair of flanges 132 on the inside of which are disposed a pair of dimples 133 and pivots 134 adapted to engage corresponding slots 35 and holes 36 in the bezel 131. An aperture 137 is provided as a key ring hole. The interconnection of cover 130 with bezel 131, and its operation is shown in greater detail with reference to FIG. 12C.

Figure 13A:
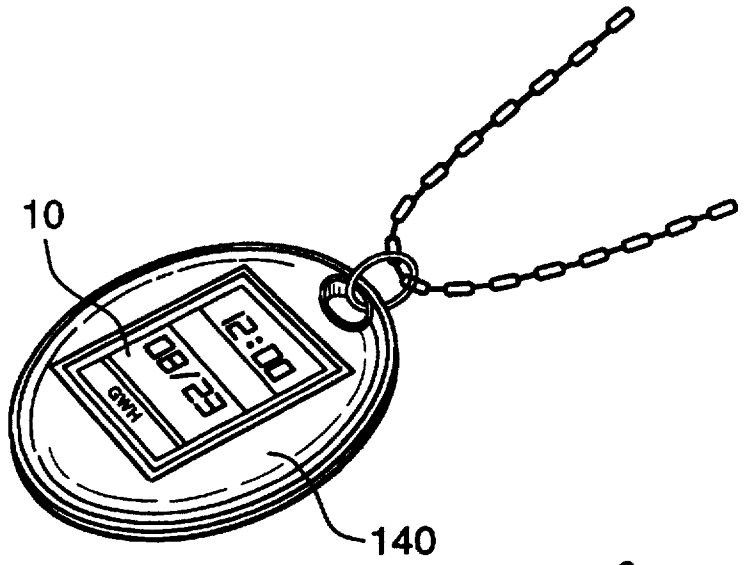
Figure 13B:
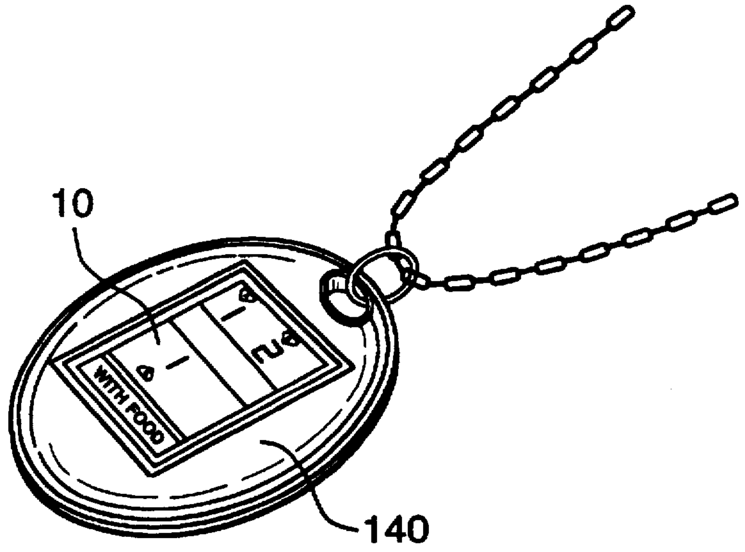
Figure 13C:
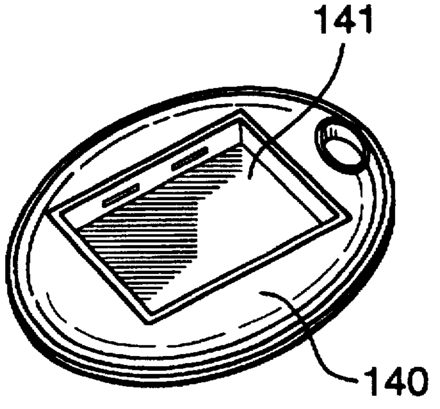

FIGS. 13A, 13B and 13C show a spoon-shaped moulded plastic pendant 140 having a recess 141 with internal flanges to receive and hold the medicament regime control device 10.

Figure 14A:
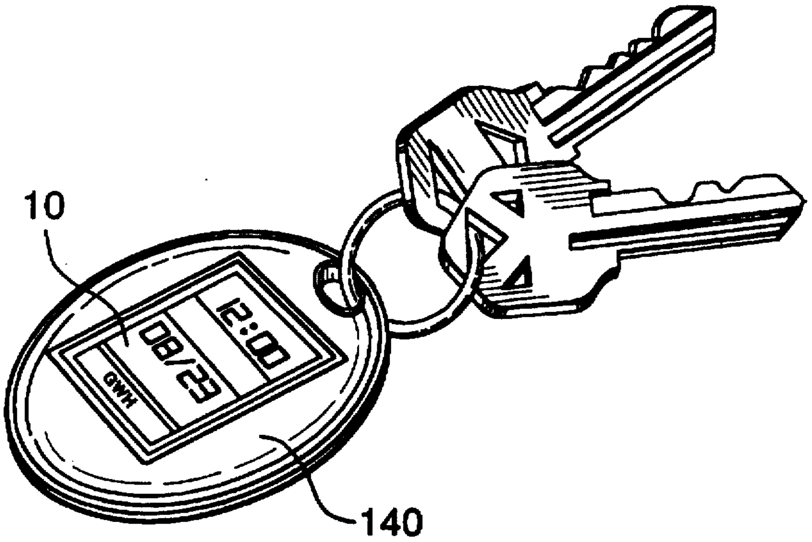
Figure 14B:
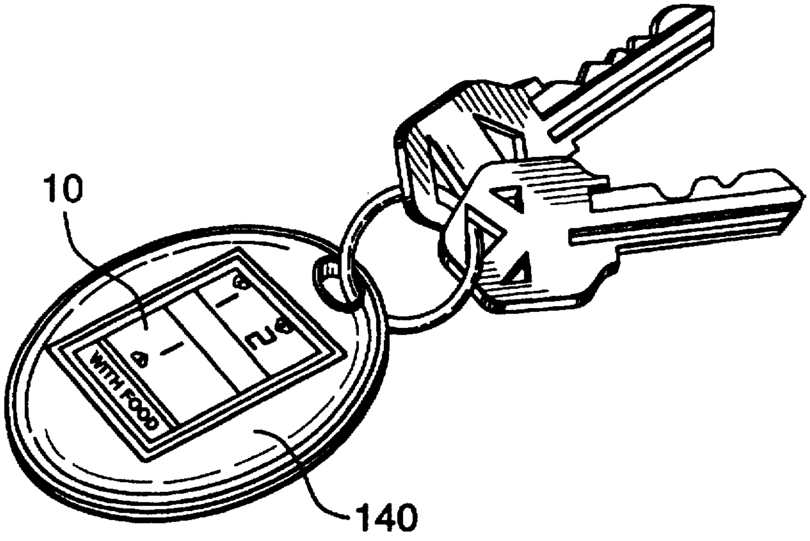
Figure 14C:
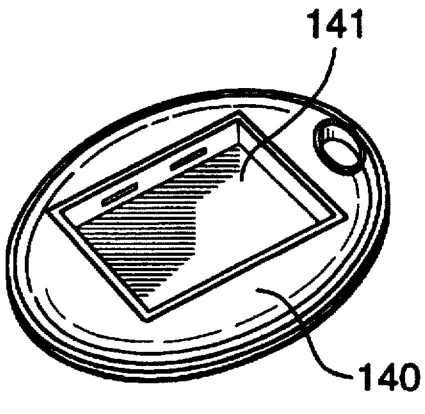

FIGS. 14A, 14B and 14C show the device 140 for use with a key fob. In FIGS. 13A and 14A, the device 10 is shown in time/date mode, whereas in FIGS. 13B, 14B, the device 10 is shown in alarm mode.

SUMMARY OF DISCLOSURE

In summary of this disclosure, the present invention provides a novel medicament regime control device and overall system of medication control which has significant advantages over the prior art, as enumerated herein. Modifications are possible within the scope of this invention.

| DRIVE NAME | | | COMMON NAME | | | DESCRIPTION | | |
|---|---|---|---|---|---|---|---|---|
| NAME | ID | PIN # | NAME | ID | PIN # | TYPE | LOCATION | ELEMENT |
| CONNECTIONS TO MICRO- PROCESSOR | | | | | | | | |
| SEG | 0 | 34 | COM | 0 | 62 | 7 SEGMENT | "A" | a |
| SEG | 1 | 33 | COM | 0 | 62 | 7 SEGMENT | "A" | b |
| SEG | 2 | 32 | COM | 0 | 62 | 7 SEGMENT | "A" | c |
| SEG | 3 | 31 | COM | 0 | 62 | 7 SEGMENT | "A" | d |
| SEG | 4 | 30 | COM | 0 | 62 | 7 SEGMENT | "A" | e |
| SEG | 5 | 29 | COM | 0 | 62 | 7 SEGMENT | "A" | f |
| SEG | 6 | 28 | COM | 0 | 62 | 7 SEGMENT | "A" | g |
| SEG | 0 | 34 | COM | 1 | 63 | 7 SEGMENT | "B" | a |
| SEG | 1 | 33 | COM | 1 | 63 | 7 SEGMENT | "B" | b |
| SEG | 2 | 32 | COM | 1 | 63 | 7 SEGMENT | "B" | c |
| SEG | 3 | 31 | COM | 1 | 63 | 7 SEGMENT | "B" | d |
| SEG | 4 | 30 | COM | 1 | 63 | 7 SEGMENT | "B" | e |

-continued

| | | | | | | | | |
|---|---|---|---|---|---|---|---|---|
| SEG | 5 | 29 | COM | 1 | 63 | 7 SEGMENT | “B” | f |
| SEG | 6 | 28 | COM | 1 | 63 | 7 SEGMENT | “B” | g |
| SEG | 0 | 34 | COM | 2 | 64 | 7 SEGMENT | “C” | a |
| SEG | 1 | 33 | COM | 2 | 64 | 7 SEGMENT | “C” | b |
| SEG | 2 | 32 | COM | 2 | 64 | 7 SEGMENT | “C” | c |
| SEG | 3 | 31 | COM | 2 | 64 | 7 SEGMENT | “C” | d |
| SEG | 4 | 30 | COM | 2 | 64 | 7 SEGMENT | “C” | e |
| SEG | 5 | 29 | COM | 2 | 64 | 7 SEGMENT | “C” | f |
| SEG | 6 | 28 | COM | 2 | 64 | 7 SEGMENT | “C” | g |
| SEG | 0 | 34 | COM | 3 | 65 | 7 SEGMENT | “D” | a |
| SEG | 1 | 33 | COM | 3 | 65 | 7 SEGMENT | “D” | b |
| SEG | 2 | 32 | COM | 3 | 65 | 7 SEGMENT | “D” | c |
| SEG | 3 | 31 | COM | 3 | 65 | 7 SEGMENT | “D” | d |
| SEG | 4 | 30 | COM | 3 | 65 | 7 SEGMENT | “D” | e |
| SEG | 5 | 29 | COM | 3 | 65 | 7 SEGMENT | “D” | f |
| SEG | 6 | 28 | COM | 3 | 65 | 7 SEGMENT | “D” | g |
| SEG | 0 | 34 | COM | 4 | 66 | 7 SEGMENT | “J” | a |
| SEG | 1 | 33 | COM | 4 | 66 | 7 SEGMENT | “J” | b |
| SEG | 2 | 32 | COM | 4 | 66 | 7 SEGMENT | “J” | c |
| SEG | 3 | 31 | COM | 4 | 66 | 7 SEGMENT | “J” | d |
| SEG | 4 | 30 | COM | 4 | 66 | 7 SEGMENT | “J” | e |
| SEG | 5 | 29 | COM | 4 | 66 | 7 SEGMENT | “J” | f |
| SEG | 6 | 28 | COM | 4 | 66 | 7 SEGMENT | “J” | g |
| SEG | 0 | 34 | COM | 5 | 67 | 7 SEGMENT | “K” | a |
| SEG | 1 | 33 | COM | 5 | 67 | 7 SEGMENT | “K” | b |
| SEG | 2 | 32 | COM | 5 | 67 | 7 SEGMENT | “K” | c |
| SEG | 3 | 31 | COM | 5 | 67 | 7 SEGMENT | “K” | d |
| SEG | 4 | 30 | COM | 5 | 67 | 7 SEGMENT | “K” | e |
| SEG | 5 | 29 | COM | 5 | 67 | 7 SEGMENT | “K” | f |
| SEG | 6 | 28 | COM | 5 | 67 | 7 SEGMENT | “K” | g |
| | | | | | | MII-PINS XLS | | |
| SEG | 0 | 34 | COM | 6 | 68 | 7 SEGMENT | “L” | a |
| SEG | 1 | 33 | COM | 6 | 68 | 7 SEGMENT | “L” | b |
| SEG | 2 | 32 | COM | 6 | 68 | 7 SEGMENT | “L” | c |
| SEG | 3 | 31 | COM | 6 | 68 | 7 SEGMENT | “L” | d |
| SEG | 4 | 30 | COM | 6 | 68 | 7 SEGMENT | “L” | e |
| SEG | 5 | 29 | COM | 6 | 68 | 7 SEGMENT | “L” | f |
| SEG | 6 | 28 | COM | 6 | 68 | 7 SEGMENT | “L” | g |
| SEG | 0 | 34 | COM | 7 | 69 | 7 SEGMENT | “M” | a |
| SEG | 1 | 33 | COM | 7 | 69 | 7 SEGMENT | “M” | b |
| SEG | 2 | 32 | COM | 7 | 69 | 7 SEGMENT | “M” | c |
| SEG | 3 | 31 | COM | 7 | 69 | 7 SEGMENT | “M” | d |
| SEG | 4 | 30 | COM | 7 | 69 | 7 SEGMENT | “M” | e |
| SEG | 5 | 29 | COM | 7 | 69 | 7 SEGMENT | “M” | f |
| SEG | 6 | 28 | COM | 7 | 69 | 7 SEGMENT | “M” | g |
| SEG | 7 | 27 | COM | 0 | 62 | 5 × 7 DISPLAY | CHAR #1 | 1 |
| SEG | 8 | 26 | COM | 0 | 62 | 5 × 7 DISPLAY | CHAR #1 | 2 |
| SEG | 9 | 25 | COM | 0 | 62 | 5 × 7 DISPLAY | CHAR #1 | 3 |
| SEG | 10 | 24 | COM | 0 | 62 | 5 × 7 DISPLAY | CHAR #1 | 4 |
| SEG | 11 | 23 | COM | 0 | 62 | 5 × 7 DISPLAY | CHAR #1 | 5 |
| SEG | 7 | 27 | COM | 1 | 63 | 5 × 7 DISPLAY | CHAR #1 | 6 |
| SEG | 8 | 26 | COM | 1 | 63 | 5 × 7 DISPLAY | CHAR #1 | 7 |
| SEG | 9 | 25 | COM | 1 | 63 | 5 × 7 DISPLAY | CHAR #1 | 8 |
| SEG | 10 | 24 | COM | 1 | 63 | 5 × 7 DISPLAY | CHAR #1 | 9 |
| SEG | 11 | 23 | COM | 1 | 63 | 5 × 7 DISPLAY | CHAR #1 | 10 |
| SEG | 7 | 27 | COM | 2 | 64 | 5 × 7 DISPLAY | CHAR #1 | 11 |
| SEG | 8 | 26 | COM | 2 | 64 | 5 × 7 DISPLAY | CHAR #1 | 12 |
| SEG | 9 | 25 | COM | 2 | 64 | 5 × 7 DISPLAY | CHAR #1 | 13 |
| SEG | 10 | 24 | COM | 2 | 64 | 5 × 7 DISPLAY | CHAR #1 | 14 |
| SEG | 11 | 23 | COM | 2 | 64 | 5 × 7 DISPLAY | CHAR #1 | 15 |
| SEG | 7 | 27 | COM | 3 | 65 | 5 × 7 DISPLAY | CHAR #1 | 16 |
| SEG | 8 | 26 | COM | 3 | 65 | 5 × 7 DISPLAY | CHAR #1 | 17 |
| SEG | 9 | 25 | COM | 3 | 65 | 5 × 7 DISPLAY | CHAR #1 | 18 |
| SEG | 10 | 24 | COM | 3 | 65 | 5 × 7 DISPLAY | CHAR #1 | 19 |
| SEG | 11 | 23 | COM | 3 | 65 | 5 × 7 DISPLAY | CHAR #1 | 20 |
| SEG | 7 | 27 | COM | 4 | 66 | 5 × 7 DISPLAY | CHAR #1 | 21 |
| SEG | 8 | 26 | COM | 4 | 66 | 5 × 7 DISPLAY | CHAR #1 | 22 |
| SEG | 9 | 25 | COM | 4 | 66 | 5 × 7 DISPLAY | CHAR #1 | 23 |
| SEG | 10 | 24 | COM | 4 | 66 | 5 × 7 DISPLAY | CHAR #1 | 24 |
| SEG | 11 | 23 | COM | 4 | 66 | 5 × 7 DISPLAY | CHAR #1 | 25 |
| SEG | 7 | 27 | COM | 5 | 67 | 5 × 7 DISPLAY | CHAR #1 | 26 |
| SEG | 8 | 26 | COM | 5 | 67 | 5 × 7 DISPLAY | CHAR #1 | 27 |
| SEG | 9 | 25 | COM | 5 | 67 | 5 × 7 DISPLAY | CHAR #1 | 28 |
| SEG | 10 | 24 | COM | 5 | 67 | 5 × 7 DISPLAY | CHAR #1 | 29 |
| SEG | 11 | 23 | COM | 5 | 67 | 5 × 7 DISPLAY | CHAR #1 | 30 |
| SEG | 7 | 27 | COM | 6 | 68 | 5 × 7 DISPLAY | CHAR #1 | 31 |
| SEG | 8 | 26 | COM | 6 | 68 | 5 × 7 DISPLAY | CHAR #1 | 32 |
| SEG | 9 | 25 | COM | 6 | 68 | 5 × 7 DISPLAY | CHAR #1 | 33 |
| SEG | 10 | 24 | COM | 6 | 68 | 5 × 7 DISPLAY | CHAR #1 | 34 |

-continued

| | | | | | | | | |
|---|---|---|---|---|---|---|---|---|
| SEG | 11 | 23 | COM | 6 | 68 | 5 × 7 DISPLAY | CHAR #1 | 35 |
| SEG | 12 | 22 | COM | 0 | 62 | 5 × 7 DISPLAY | CHAR #2 | 1 |
| SEG | 13 | 21 | COM | 0 | 62 | 5 × 7 DISPLAY | CHAR #2 | 2 |
| SEG | 14 | 20 | COM | 0 | 62 | 5 × 7 DISPLAY | CHAR #2 | 3 |
| SEG | 15 | 19 | COM | 0 | 62 | 5 × 7 DISPLAY | CHAR #2 | 4 |
| SEG | 16 | 18 | COM | 0 | 62 | 5 × 7 DISPLAY | CHAR #2 | 5 |
| SEG | 12 | 22 | COM | 1 | 63 | 5 × 7 DISPLAY | CHAR #2 | 6 |
| SEG | 13 | 21 | COM | 1 | 63 | 5 × 7 DISPLAY | CHAR #2 | 7 |
| SEG | 14 | 20 | COM | 1 | 63 | 5 × 7 DISPLAY | CHAR #2 | 8 |
| SEG | 15 | 19 | COM | 1 | 63 | 5 × 7 DISPLAY | CHAR #2 | 9 |
| SEG | 16 | 18 | COM | 1 | 63 | 5 × 7 DISPLAY | CHAR #2 | 10 |
| SEG | 12 | 22 | COM | 2 | 64 | 5 × 7 DISPLAY | CHAR #2 | 11 |
| SEG | 13 | 21 | COM | 2 | 64 | 5 × 7 DISPLAY | CHAR #2 | 12 |
| SEG | 14 | 20 | COM | 2 | 64 | 5 × 7 DISPLAY | CHAR #2 | 13 |
| SEG | 15 | 19 | COM | 2 | 64 | 5 × 7 DISPLAY | CHAR #2 | 14 |
| SEG | 16 | 18 | COM | 2 | 64 | 5 × 7 DISPLAY | CHAR #2 | 15 |
| SEG | 12 | 22 | COM | 3 | 65 | 5 × 7 DISPLAY | CHAR #2 | 16 |
| SEG | 13 | 21 | COM | 3 | 65 | 5 × 7 DISPLAY | CHAR #2 | 17 |
| SEG | 14 | 20 | COM | 3 | 65 | 5 × 7 DISPLAY | CHAR #2 | 18 |
| SEG | 15 | 19 | COM | 3 | 65 | 5 × 7 DISPLAY | CHAR #2 | 19 |
| SEG | 16 | 18 | COM | 3 | 65 | 5 × 7 DISPLAY | CHAR #2 | 20 |
| SEG | 12 | 22 | COM | 4 | 66 | 5 × 7 DISPLAY | CHAR #2 | 21 |
| SEG | 13 | 21 | COM | 4 | 66 | 5 × 7 DISPLAY | CHAR #2 | 22 |
| SEG | 14 | 20 | COM | 4 | 66 | 5 × 7 DISPLAY | CHAR #2 | 23 |
| SEG | 15 | 19 | COM | 4 | 66 | 5 × 7 DISPLAY | CHAR #2 | 24 |
| SEG | 16 | 18 | COM | 4 | 66 | 5 × 7 DISPLAY | CHAR #2 | 25 |
| SEG | 12 | 22 | COM | 5 | 67 | 5 × 7 DISPLAY | CHAR #2 | 26 |
| SEG | 13 | 21 | COM | 5 | 67 | 5 × 7 DISPLAY | CHAR #2 | 27 |
| SEG | 14 | 20 | COM | 5 | 67 | 5 × 7 DISPLAY | CHAR #2 | 28 |
| SEG | 15 | 19 | COM | 5 | 67 | 5 × 7 DISPLAY | CHAR #2 | 29 |
| SEG | 16 | 18 | COM | 5 | 67 | 5 × 7 DISPLAY | CHAR #2 | 30 |
| SEG | 12 | 22 | COM | 6 | 68 | 5 × 7 DISPLAY | CHAR #2 | 31 |
| SEG | 13 | 21 | COM | 6 | 68 | 5 × 7 DISPLAY | CHAR #2 | 32 |
| SEG | 14 | 20 | COM | 6 | 68 | 5 × 7 DISPLAY | CHAR #2 | 33 |
| SEG | 15 | 19 | COM | 6 | 68 | 5 × 7 DISPLAY | CHAR #2 | 34 |
| SEG | 16 | 18 | COM | 6 | 68 | 5 × 7 DISPLAY | CHAR #2 | 35 |
| SEG | 17 | 17 | COM | 0–6 | | 5 × 7 DISPLAY | CHAR #3 | 1 |
| SEG | 18 | 16 | COM | 0–6 | | | | — |
| SEG | 19 | 15 | COM | 0–6 | | (THIS TABLE | — | |
| SEG | 20 | 14 | COM | 0–6 | | IS REDUCED) | — | |
| SEG | 21 | 13 | COM | 0–6 | | | | 35 |
| SEG | 22 | 12 | COM | 0–6 | | 5 × 7 DISPLAY | CHAR #4 | 1 |
| SEG | 23 | 11 | COM | 0–6 | | | | — |
| SEG | 24 | 10 | COM | 0–6 | | (THIS TABLE | — | |
| SEG | 25 | 9 | COM | 0–6 | | IS REDUCED) | — | |
| SEG | 26 | 8 | COM | 0–6 | | | | 35 |
| SEG | 27 | 7 | COM | 0–6 | | 5 × 7 DISPLAY | CHAR #5 | 1 |
| SEG | 28 | 6 | COM | 0–6 | | | | — |
| SEG | 29 | 5 | COM | 0–6 | | (THIS TABLE | — | |
| SEG | 30 | 4 | COM | 0–6 | | IS REDUCED) | — | |
| SEG | 31 | 3 | COM | 0–6 | | | | 35 |
| SEG | 32 | 2 | COM | 0–6 | | 5 × 7 DISPLAY | CHAR #6 | 1 |
| SEG | 33 | 1 | COM | 0–6 | | | | — |
| SEG | 34 | 100 | COM | 0–6 | | (THIS TABLE | — | |
| SEG | 35 | 99 | COM | 0–6 | | IS REDUCED) | — | |
| SEG | 36 | 98 | COM | 0–6 | | | | 35 |
| SEG | 37 | 97 | COM | 0–6 | | 5 × 7 DISPLAY | CHAR #7 | 1 |
| SEG | 38 | 96 | COM | 0–6 | | | | — |
| SEG | 39 | 95 | COM | 0–6 | | (THIS TABLE | — | |
| SEG | 40 | 94 | COM | 0–6 | | IS REDUCED) | — | |
| SEG | 41 | 93 | COM | 0–6 | | | | 35 |
| SEG | 42 | 92 | COM | 0–6 | | 5 × 7 DISPLAY | CHAR #8 | 1 |
| SEG | 43 | 90 | COM | 0–6 | | | | — |
| SEG | 44 | 89 | COM | 0–6 | | (THIS TABLE | — | |
| SEG | 45 | 88 | COM | 0–6 | | IS REDUCED) | — | |
| SEG | 46 | 87 | COM | 0–6 | | | | 35 |
| SEG | 47 | 86 | COM | 5 | | ICON | COLLIN | |
| SEG | 48 | 85 | COM | 5 | | ICON | SLASH | |
| SEG | 47 | 86 | COM | 6 | | ICON | A | |
| SEG | 48 | 85 | COM | 6 | | ICON | B | |
| SEG | 49 | 84 | COM | 6 | | ICON | C | |
| SEG | 50 | 83 | COM | 6 | | ICON | D | |
| SEG | 47 | 86 | COM | 7 | | ICON | J | |
| SEG | 48 | 85 | COM | 7 | | ICON | K | |
| SEG | 49 | 84 | COM | 7 | | ICON | L | |
| SEG | 50 | 83 | COM | 7 | | ICON | M | |
| SEG | 51 | 82 | COM | 7 | | ICON | AM | |
| SEG | 52 | 81 | COM | 7 | | ICON | PM | |

-continued

| OTHE CONNECTIONS | | |
|---|---|---|
| NAME | PIN # | DESCRIPTION |
| Vss | 91 | Common Ground |
| Vdd | 40 | Drive Voltage |
| P1 0/INT 0 | 51 | BUTTON CONTACT 1 |
| P1 1/INT 1 | 52 | BUTTON CONTACT 2 |
| P1 2/INT 2 | 53 | INPUT FROM I/R RCVR. |
| P2 2/LCDSY | 57 | OUTPUT TO I/R XMTR. |
| P0 3/BUZ/KO | 47 | OUTPUT TO BUZZER |
| RESET | 46 | RESET CONTROL |
| XT IN | 44 | 32 KHZ XTL OSCILLATOR IN |
| XT OUT | 45 | 32 KHZ XTL OSCILLATOR OUT |
| ALL OTHER PINS NOT USED OR CONNECTED | | |

What we claim is:

1. A portable medicament regime control device, comprising:

a housing having an upper face, display means associated with said upper face having a plurality of individual displays arranged in a first row of side-by-side displays each adapted to selectively display individual and different alphabetic letters and a second row of side-by-side displays aligned with the individual displays of the first row and each adapted to selectively display individual numerals therein, and preprogrammed electronic circuit means within said housing and operatively connected to said display means for controlling interchangeable and selected messages conveyed by at least one combination of an alphabetic letter in a display in said first row and a numeral in an aligned display in said second row, including a message corresponding to the number of units of medication indicated by a displayed numeral of selected ones of different medicaments indicated by a displayed alphabetic letter aligned with a displayed numeral in accordance with an established medicament regime.

2. The device of claim 1 wherein said first and second rows are adjacent to one another on said upper face.

3. The device of claim 2 wherein there are four individual displays in each of said first and second rows.

4. The device of claim 3 wherein each said individual display is a liquid crystal display.

5. A portable medication manager, comprising a tray having a plurality of compartments each for holding a predetermined quantity of a patient prescription, a further compartment for .holding a medicament regime control device as defined in claim 1 for alerting said patient as to when each said prescription is to be taken, and a lid for snap-fit engagement with said tray to contain each said patient prescription and said medicament regime control device in said respective compartments.

6. The portable medication manager of claim 5, wherein said tray includes a plurality of slots for receiving a corresponding plurality of lips protruding from said lid for effecting said snap-fit engagement of said lid with said tray.

7. The portable medication manager of claim 6, wherein said tray includes a further slot having chamfered edges for patient access to said medicament regime control device when said lid is in snap-fit engagement with said tray.

8. The portable medication manager of claim 5, wherein said lid includes a plurality of capital letter designations aligned with respective ones of said compartments when said lid is in snap-fit engagement with said tray, said capital letter designations corresponding to respective ones of said alphabetic letters displayed by said medicament regime control device.

9. A medicament regime control device, comprising:

a housing having an upper face, display means associated with said upper face having a plurality of individual displays arranged in a first row and a second row of displays, each adapted to selectively display individual numerals therein, preprogrammed electronic circuit means within said housing and operatively connected to said display means for controlling interchangeable and selected messages conveyed by a numeral in at least one of said displays in said first and second row, including a message conveying the number of units of medication indicated by a displayed numeral of selected ones of differing medicaments conveyed by an aligned indicia, and means for providing individual distinguished indicia on said upper face one adjacent each of said individual displays corresponding to individual medicaments to be taken by a patient in accordance with an established medicament regime.

10. The device of claim 9 wherein said means for providing individual distinguished indicia on said upper face comprises a third row and a fourth row of side-by-side displays each adapted to selectively display individual and different alphabetic letters, individual displays in said third row being aligned with individual displays in said first row and individual displays in said fourth row being aligned with individual displays in said second row, and said electronic circuit means further is operatively connected to said display means for controlling interchangeable and selected messages conveyed by at least one combination of an alphabetic letter in a display in said third and fourth row and a numeral in an aligned display in said first and second rows, respectively.

11. The device of claim 10 wherein each of said first, second, third and fourth rows comprise four individual displays.

12. The device of claim 11 wherein each said individual display is a liquid crystal display.

13. The device of claim 12 wherein said housing is generally rectangular in planar view.

14. The device of claim 13 wherein said rows are arranged on said upper face with said third row and fourth rows having aligned individual displays and being spaced apart from each other by said first and second rows.

15. The device of claim 14 wherein said electronic circuit means further is operatively connected to said display means for selectively controlling the display, in one of the first and second rows, of a representation of the time of a day and, in the other of the first and second rows, a representation of the day and month of a year.

16. The device of claim 15 wherein a fifth row of individual side-by-side displays is provided on said upper face each adapted to display individual symbols, and said electronic circuit means is operatively connected to said display means for controlling interchangeable and selected messages conveyed by a combination of symbols in said fifth row different from the message conveyed by a combination of an individual alphabetic letter in a display in said third and fourth rows and a numeral in an aligned display in said first and second rows respectively.

17. The device of claim 12 wherein said housing is generally hexagonal in planar view.

18. The device of claim 13 wherein said third and fourth rows selectively and individually display the alphabetic letters from A to D and J to M, respectively, in alphabetic sequence corresponding to the individual one of the side-by-side displays in said third and fourth rows.

19. The device of claim 13 wherein each of said individual displays of said first and second rows also are adapted to display selective alphabetic letters and symbols and said electronic circuit means further is operatively connected to said display means for controlling interchangeable and selected messages conveyed by a combination of an alphabetic letter in a display in said first and second rows and an alphabetic letter in an aligned display in said third and fourth rows, respectively.

20. A medicament regime control device, comprising:

a housing having an upper face, display means associated with said upper face having a plurality of individual displays arranged in a first row of displays arranged in a first row of side-by-side displays each adapted to selectively display individual numerals therein and in a second row of side-by-side displays each adapted to selectively display individual symbols, preprogrammed electronic circuit means within said housing and operatively connected to said display means for controlling interchangeable and selected different message conveyed by a numeral in a display in said first row and a combination of symbols in displays in said second row, including a message corresponding to a number of units of medication indicated by a displayed numeral of selected ones of different medicaments conveyed by an aligned indicia, and means for providing individual distinguished indicia on said upper face one adjacent each of said individual displays in said first row corresponding to individual medicaments to be taken by a patient in accordance with an established medicament regime.

21. The device of claim 20 wherein said means for providing individual distinguished indicia on said upper face comprises a third row of side-by-side displays each adapted to selectively display individual and different alphabetic letters, individual displays in said third row being aligned with individual displays in said first row, and said electronic circuit means is operatively connected to said display means for controlling interchangeable and selected messages conveyed by at least one combination of an alphabetic letter in a display in said third row and a numeral in an aligned display in said first row.

22. The device of claim 21 wherein a fourth and fifth row of side-by-side displays is provided, with each display in said fourth row being adapted to selectively display individual numerals therein and each display in said fifth row being adapted to selectively display individual and different alphabetic letters which are further different from those displayed by said third row, individual displays in said fourth row being aligned with individual displays in said fifth row.

23. The device of claim 22 wherein said housing is rectangular in planar view.

24. The device of claim 23 wherein said rows are arranged on said upper face with said second row extending across a shorter dimension of the rectangular face adjacent one longitudinal extremity thereof, said third and fifth rows extending across a shorter dimension of the rectangular face one adjacent the other longitudinal extremity of said face and the other adjacent to said second row so as to be spaced from each other and aligned, and said first and fourth rows extending across a shorter dimension of the rectangular face in the space between the third and fifth rows.

25. The device of claim 8 wherein said electronic circuit means further is operatively connected to said display means for selectively controlling the display, in one of the first and fourth rows, of a representation of the time of a day and, in the other of the first and fourth rows, a representation of the day and month of a year.

26. The device of claim 8 wherein said second row selectively displays messages to refill a particular medicament, an owner's initials or other identification, this indicated medication should be taken with food or without dairy products, including milk, that a particular indicated medication should be omitted, that special instructions exist with respect to a particular identified medication, that a battery power supply is low and, that the unit requires replacement upon substantial exhaustion of a battery power supply.

27. A system for programming the medicament regime control device of claim 1, 5 or 20, comprising a pharmacy computer for receiving patient and prescription information and generating a data file representative thereof, a data transfer device connected to said pharmacy computer for translating said data file from a format defined by said pharmacy computer into a format suitable for transmission to said medicament regime control device, and a data link for transmitting said data file from said data transfer device to said medicament regime control device for programming said electronic circuit means to activate said displays in accordance with the medicament regime.

28. The system as defined in claim 27, wherein said data transfer device comprises a main processor means for receiving said data file, a personality memory means connected to said main processor means for effecting said translating of said data file in conjunction with said main processor means, a buffer means for buffering said data file during transmission thereof to said medicament control device, and a power supply for providing operating power to said main processor means, said personality memory means and said buffer means.

29. The system of claim 27, wherein said data control link comprises an infrared transmitter within said data transfer device and an infrared receiver within said medicament regime control device.

30. A carrying case for the medicament regime control device of claim 1, 5 or 20, comprising a main body portion, a compartment within said main body portion for receiving said medicament regime control device, and means for securing said medicament regime control device within said compartment.

31. The carrying case of claim 30, wherein said main body portion and said compartment are in the from of a generally rectangular bezel for receiving said medicament regime control device, and said means for securing comprises a lid which is pivotally attached to said bezel.

32. The carrying case of claim 31, wherein said bezel includes a pair of arcuate slots and a pair of pivot holes for receiving respective ones of a pair of dimples and a pair of pivot pins projecting from said lid.

33. The carrying case of claim 30, wherein said main body portion is in the form of a generally oval pendant with said compartment moulded therein, said compartment having a plurality of flanges arranged therearound for securing said medicament regime control device within said compartment.

* * * * *